United States Patent
Tanae et al.

(10) Patent No.: US 9,986,216 B2
(45) Date of Patent: *May 29, 2018

(54) ABERRATION CORRECTION APPARATUS, IMAGING APPARATUS AND ABERRATION CORRECTION METHOD

(71) Applicant: Sony Corporation, Tokyo (JP)

(72) Inventors: Takuma Tanae, Kanagawa (JP); Rui Kouno, Kanagawa (JP)

(73) Assignee: Sony Corporation, Tokyo (JP)

( * ) Notice: Subject to any disclaimer, the term of this patent is extended or adjusted under 35 U.S.C. 154(b) by 21 days.

This patent is subject to a terminal disclaimer.

(21) Appl. No.: 15/182,073

(22) Filed: Jun. 14, 2016

(65) Prior Publication Data

US 2016/0295188 A1  Oct. 6, 2016

Related U.S. Application Data

(63) Continuation of application No. 14/491,355, filed on Sep. 19, 2014, now Pat. No. 9,406,109.

(30) Foreign Application Priority Data

Sep. 26, 2013  (JP) .................................. 2013-200041

(51) Int. Cl.
| | | |
|---|---|---|
| H04N 9/64 | (2006.01) | |
| H04N 5/232 | (2006.01) | |
| G06T 5/00 | (2006.01) | |
| H04N 5/357 | (2011.01) | |
| H04N 9/69 | (2006.01) | |
| H04N 9/73 | (2006.01) | |

(52) U.S. Cl.
CPC .............. *H04N 9/646* (2013.01); *G06T 5/003* (2013.01); *G06T 5/006* (2013.01); *H04N 5/23296* (2013.01); *H04N 5/3572* (2013.01); *H04N 9/69* (2013.01); *H04N 9/735* (2013.01)

(58) Field of Classification Search
CPC ....................................................... H04N 9/646
USPC ....................................................... 348/224.1
See application file for complete search history.

(56) References Cited

FOREIGN PATENT DOCUMENTS

| | | |
|---|---|---|
| JP | 2009-290863 | 12/2009 |
| JP | 2010-263255 | 11/2010 |
| JP | 2011-223217 | 11/2011 |
| JP | 2013-179398 | 9/2013 |

OTHER PUBLICATIONS

Official Action (no English translation available) for Japanese Patent Application No. 2013-200041 dated Oct. 18, 2016, 5 pages.

*Primary Examiner* — Joel Fosselman
(74) *Attorney, Agent, or Firm* — Sheridan Ross P.C.

(57) ABSTRACT

An aberration correction apparatus includes an aberration information acquisition unit which acquires aberration information from an imaging lens; a spectroscopic characteristic information acquisition unit which acquires spectroscopic characteristic information of an imaging device which performs a photoelectric conversion of an optical image that is formed in the imaging lens; and an aberration information correction unit which performs a correction according to the spectroscopic characteristic information with respect to the acquired aberration information.

24 Claims, 10 Drawing Sheets

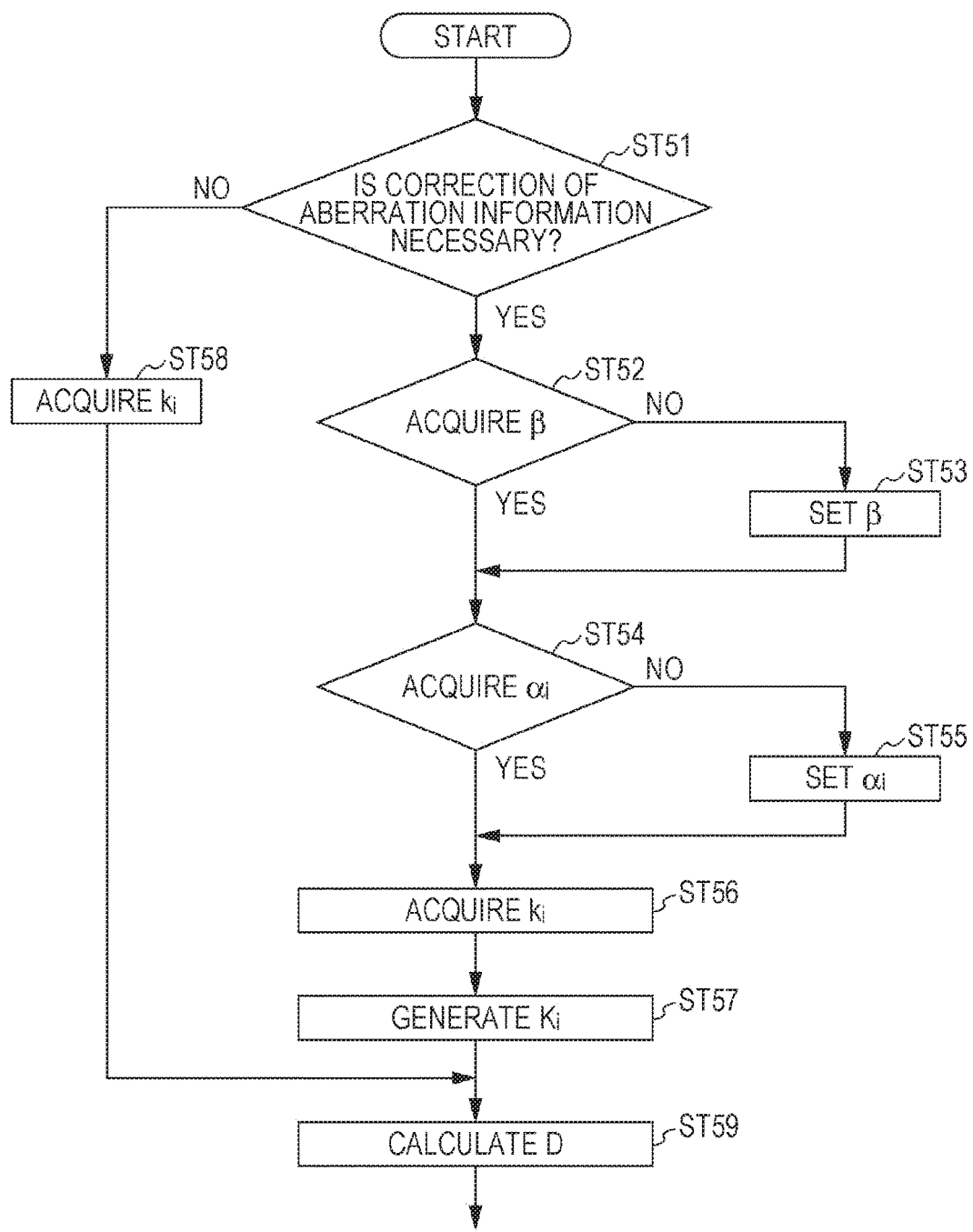

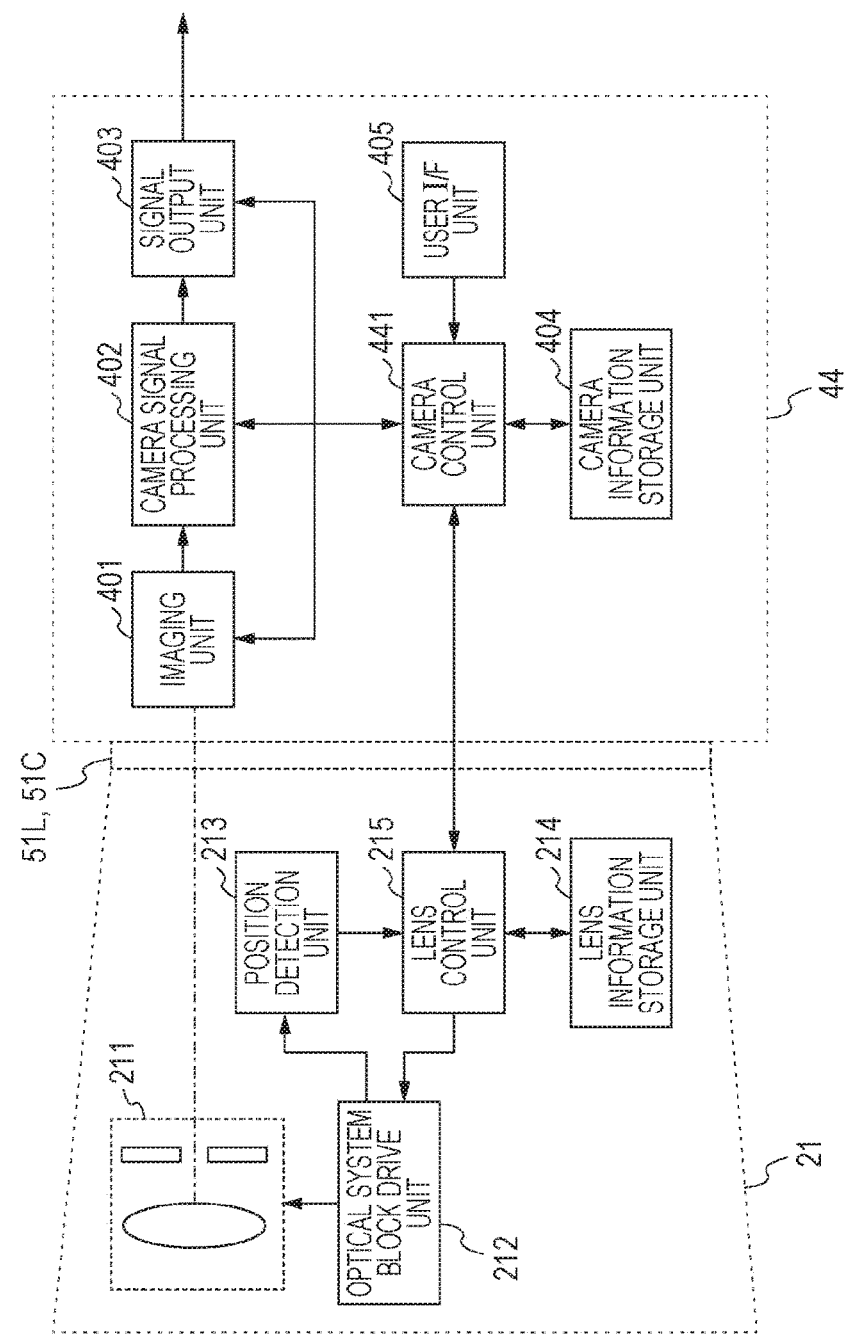

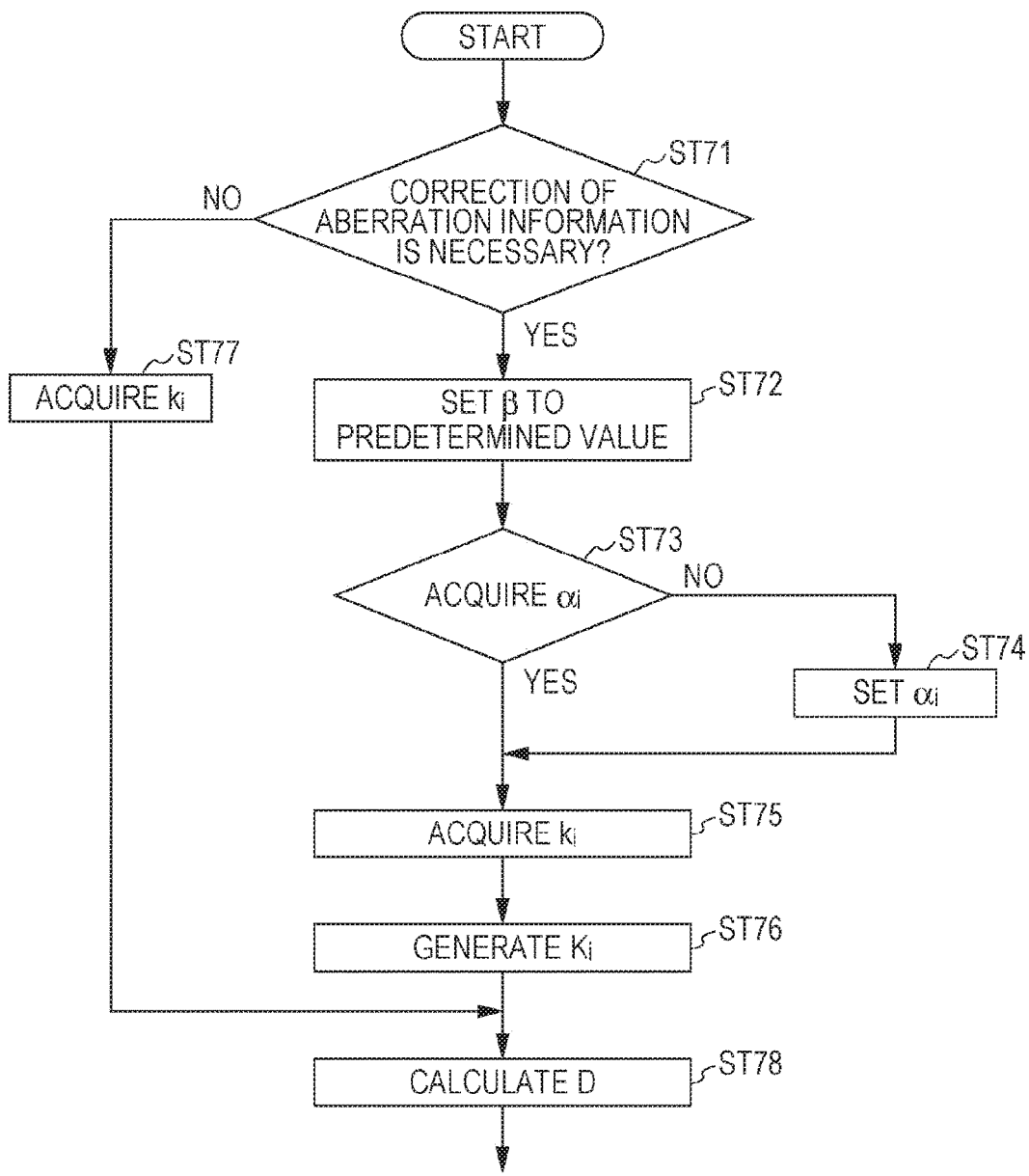

ABERRATION CORRECTION APPARATUS, IMAGING APPARATUS AND ABERRATION CORRECTION METHOD

CROSS REFERENCE TO RELATED APPLICATIONS

This application is a continuation of U.S. patent application Ser. No. 14/491,355, filed Sep. 19, 2014, which claims the benefit of Japanese Patent Application No. JP 2013-200041, filed Sep. 26, 2013, the entire disclosures of which are hereby incorporated herein by reference.

BACKGROUND

The present technology relates to an aberration correction apparatus, an imaging apparatus, and an aberration correction method, in which a good correction of the aberration that is generated by an optical system is performed.

An imaging apparatus such as a video camera of the related art performs an aberration correction using signal processing with respect to a captured image signal. In addition, an imaging apparatus with an exchangeable imaging lens acquires aberration information of the mounted imaging lens, and performs the aberration correction based on the aberration information (for example, refer to Japanese Unexamined Patent Application Publication No. 2011-223217).

SUMMARY

Incidentally, an imaging lens in which aberration information indicating aberration occurring in the lens is stored is provided as the exchangeable imaging lens. In a case where such an imaging lens is used, the imaging apparatus performs the aberration correction based on the aberration information acquired from the imaging lens, and thus, it is possible to easily obtain a good captured image with little aberration. However, the aberration information such as magnification chromatic aberration information which is stored in the imaging lens represents the aberration of a spectroscopic characteristic (hereinafter, referred to as "reference spectroscopic characteristic") which is defined in advance. Thus, in a case where the spectroscopic characteristic of the imaging apparatus is different from the reference spectroscopic characteristic, even if the aberration correction is performed based on the aberration information acquired from the imaging lens, there is concern that it may be difficult to obtain the good captured image with little aberration.

Therefore, in the present technology, it is desirable to provide an aberration correction apparatus, an imaging apparatus, and an aberration correction method in which a good aberration correction can be performed.

An aberration correction apparatus according to an embodiment of the present technology includes an aberration information acquisition unit which acquires aberration information from an imaging lens; a spectroscopic characteristic information acquisition unit which acquires spectroscopic characteristic information of an imaging device which performs a photoelectric conversion of an optical image that is formed in the imaging lens; and an aberration information correction unit which performs a correction according to the spectroscopic characteristic information with respect to the acquired aberration information.

In such a technology, the aberration information is acquired from the imaging lens. In addition, the spectroscopic characteristic information with regard to the imaging device which performs the photoelectric conversion of the optical image which is formed in the imaging lens, is acquired. For example, based on a reference spectroscopic characteristic when the aberration information acquired from the imaging lens is generated and the spectroscopic characteristic of the imaging device, the spectroscopic characteristic information is acquired for each color component different from one color component which is used as a reference, among three primary color components. The acquired aberration information is corrected according to the spectroscopic characteristic information, and based on the corrected aberration information, the aberration correction is performed. In addition, the optical conversion information on the optical conversion which is performed with respect to the optical image is acquired. For example, the optical conversion information represents an expansion magnification or a contraction magnification of the optical image set by using an imaging plane size of the imaging device defined in the aberration information which is acquired from the imaging lens, and by using an imaging plane size of the imaging device which performs the photoelectric conversion of the optical image which is formed in the imaging lens, as a reference. The acquired aberration information is corrected according to the spectroscopic characteristic information and the optical conversion information, and based on the corrected aberration information, the aberration correction is performed. In a case where it is difficult to acquire the spectroscopic characteristic information, the setting of the spectroscopic characteristic information, or the modification of the acquired spectroscopic characteristic information, can be performed, or in a case where it is difficult to acquire the optical conversion information, the setting of the optical conversion information, or the modification of the acquired optical conversion information, can be performed, and it is possible to control the correction of the aberration information in such a manner that a good captured image with little aberration is obtained. The correction of such aberration information is performed by an adapter apparatus provided between the imaging lens and the imaging apparatus, the imaging apparatus, or the adapter apparatus and the imaging apparatus.

An imaging apparatus according to another embodiment of the present technology includes an aberration information acquisition unit which acquires aberration information from an imaging lens; an imaging device which performs a photoelectric conversion of an optical image that is formed in the imaging lens; a spectroscopic characteristic information acquisition unit which acquires spectroscopic characteristic information of the imaging device; an aberration information correction unit which performs a correction according to a spectroscopic characteristic of the imaging device with respect to the acquired aberration information; and an aberration correction processing unit which performs an aberration correction using the aberration information corrected by the aberration information correction unit.

An aberration correction method according to still another embodiment of the present technology includes acquiring aberration information from an imaging lens in an aberration information acquisition unit; acquiring spectroscopic characteristic information of an imaging device which performs a photoelectric conversion of an optical image that is formed in the imaging lens in a spectroscopic characteristic information acquisition unit; and performing a correction according to the spectroscopic characteristic information with respect to the acquired aberration information in an aberration information correction unit.

According to the technology, aberration information which is acquired from an imaging lens is corrected based on spectroscopic characteristic information with regard to an imaging device which performs a photoelectric conversion of an optical image which is formed in an imaging lens. Thus, for example, even in a case where a spectroscopic characteristic which is used in generating the aberration information is different from the spectroscopic characteristic of the imaging device, aberration correction processing is performed using the corrected aberration information, and thereby it is possible to obtain a good captured image with little aberration. In addition, the effects described in the present specification are only illustrative and are not limited thereto. In addition, there may be an additional effect.

BRIEF DESCRIPTION OF THE DRAWINGS

FIG. 9 is a flow chart illustrating an operation of the third embodiment;

FIG. 10 is a diagram illustrating a configuration of a fourth embodiment; and

FIG. 11 is a flow chart illustrating an operation of the fourth embodiment.

DETAILED DESCRIPTION OF EMBODIMENTS

Hereinafter, a form for performing the present technology will be described. In addition, the description will be made in the following sequence.

Figure 1:
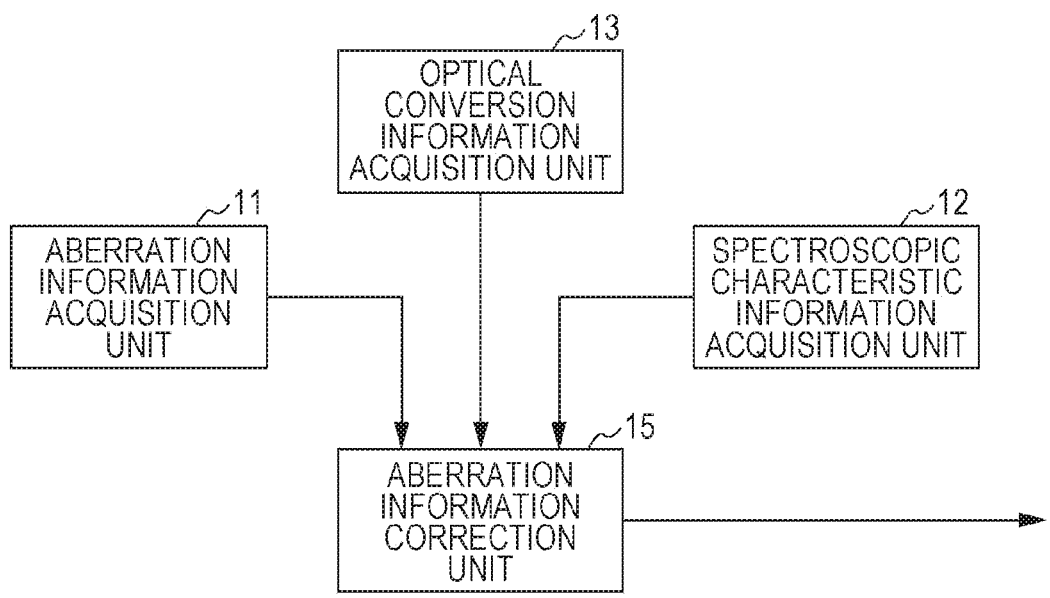
FIG. 1 is a diagram illustrating a configuration of an aberration correction apparatus.

1. Configuration and Operation of Aberration Correction Apparatus
  1-1. Configuration of Aberration Correction Apparatus
  1-2. Operation of Aberration Correction Apparatus
2. First Embodiment
  2-1. Configuration of First Embodiment
  2-2. Operation of First Embodiment
3. Second Embodiment (case where aberration correction apparatus is configured with adapter apparatus)
  3-1. Configuration of Second Embodiment
  3-2. Operation of Second Embodiment
4. Third Embodiment (case where aberration correction apparatus is configured with imaging apparatus)
  4-1. Configuration of Third Embodiment
  4-2. Operation of Third Embodiment
5. Fourth Embodiment (case where adapter apparatus is not used)
  5-1. Configuration of Fourth Embodiment
  5-2. Operation of Fourth Embodiment
6. Other Embodiment 1. Configuration and Operation of Aberration Correction Apparatus 1-1. Configuration of Aberration Correction Apparatus FIG. 1 illustrates a configuration of an aberration correction apparatus according to the present technology. The aberration correction apparatus 10 includes an aberration information acquisition unit 11, a spectroscopic characteristic information acquisition unit 12, and an aberration information correction unit 15.

The aberration information acquisition unit 11 acquires aberration information such as magnification chromatic aberration information which is stored in an imaging lens and outputs the acquired aberration information to the aberration information correction unit 15. In addition, the magnification chromatic aberration information represents an aberration of a spectroscopic characteristic (hereinafter, referred to as "reference spectroscopic characteristic") which is defined in advance as described above.

The spectroscopic characteristic information acquisition unit 12 acquires spectroscopic characteristic information of the imaging apparatus. For example, the spectroscopic characteristic information is stored in the imaging apparatus in advance. The spectroscopic characteristic information is a corrected value which is set for each color component (for example, blue color component and red color component) different from one color component (for example, green color component) which is used as a reference, among three primary color components, based on a reference spectroscopic characteristic defined in the aberration information which is acquired from the imaging lens, and a spectroscopic characteristic of the imaging device which performs a photoelectric conversion of an optical image which is formed in the imaging lens. The spectroscopic characteristic information acquisition unit 12 outputs the spectroscopic characteristic information acquired from the imaging apparatus to the aberration information correction unit 15. In addition, in a case where it is difficult to acquire the spectroscopic characteristic information, the spectroscopic characteristic information acquisition unit 12 may accept the setting of the spectroscopic characteristic information or the modification of the spectroscopic characteristic information which is acquired.

The aberration information correction unit 15 performs the correction according to the spectroscopic characteristic information acquired by the spectroscopic characteristic information acquisition unit 12, with respect to the aberration information acquired by the aberration information acquisition unit 11. The aberration information correction unit 15 performs the correction of the aberration information using the spectroscopic characteristic information. In addition, in a case where the spectroscopic characteristic of the imaging device is represented in the spectroscopic characteristic information, the aberration information correction unit 15 sets the corrected value based on the reference spectroscopic characteristic and the spectroscopic characteristic of the imaging device, and performs the correction of the aberration information. The aberration information correction unit 15 outputs the corrected aberration information to a correction processing unit which performs the aberration correction based on the aberration information.

In addition, in a case where an optical conversion is performed with respect to an optical image of a subject between the imaging lens and the imaging device, for example, a case where an adapter which includes a function of performing expansion or contraction of the optical image between the imaging lens and the imaging apparatus is provided, an optical conversion information acquisition unit 13 may be provided in the aberration correction apparatus 10.

The optical conversion information acquisition unit 13 acquires the optical conversion information representing the type of the optical conversion, and outputs the acquired optical conversion information to the aberration information correction unit 15. For example, in a case where the above-described adapter apparatus is provided, the optical conversion information acquisition unit 13 acquires an expansion magnification or a contraction magnification of the optical image as the optical conversion information. In addition, in a case where it is difficult to acquire the optical conversion information, the optical conversion information acquisition unit 13 may accept the setting of the optical conversion information or the modification of the optical conversion information which is acquired.

In a case where the optical conversion information is acquired, the aberration information correction unit 15 performs the correction according to the spectroscopic characteristic information and the optical conversion information with respect to the aberration information, and outputs the corrected aberration information to the correction processing unit which performs the aberration correction based on the aberration information.

1-2. Operation of Aberration Correction Apparatus

Figure 2:
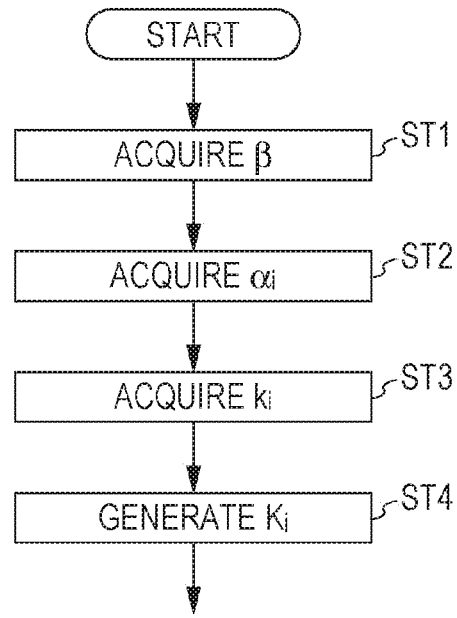
FIG. 2 is a flow chart illustrating an operation of an aberration correction apparatus.

Next, an operation of the aberration correction apparatus will be described. FIG. 2 is a flow chart illustrating the operation of the aberration correction apparatus. In addition, FIG. 2 illustrates a case where the optical conversion information acquisition unit 13 is provided.

In step ST1, the optical conversion information acquisition unit 13 acquires optical conversion information $\beta$. The optical conversion information acquisition unit 13 acquires the information that represents the expansion magnification or the contraction magnification of the optical image which is performed in, for example, the adapter apparatus as the optical conversion information $\beta$, and then proceeds to step ST2.

In step ST2, the spectroscopic characteristic information acquisition unit 12 acquires the spectroscopic characteristic information $\alpha_i$. The spectroscopic characteristic information acquisition unit 12 acquires the spectroscopic characteristic information $\alpha_i$ which is stored in advance, or the spectroscopic characteristic information $\alpha_i$ which is set by a user or the like, and then proceeds to step ST3.

In step ST3, the aberration information acquisition unit 11 acquires aberration information $k_i$. The aberration information acquisition unit 11 acquires the aberration information such as the magnification chromatic aberration information and proceeds to step ST4.

The magnification chromatic aberration information is information which represents a chromatic aberration of the reference spectroscopic characteristic, as described above, and for example, a magnification chromatic aberration quantity d with respect to an image height x can be similar to an nth order formula represented by Formula (1). In addition, the magnification chromatic aberration quantity d is a chromatic aberration quantity in which the green component image is used as the reference.

Here, the imaging lens stores a coefficient $K_i$ of Formula 1 as the aberration information for each focus distance, each lens position, or the like of the imaging lens, with regard to each of the optical image of a blue component and the optical image of a red component. In addition, the aberration information acquisition unit 11 acquires the aberration information $k_i$ of a current focus distance or the like from the imaging lens, with regard to each of the optical image of a blue component and the optical image of a red component.

In step ST4, the aberration information correction unit 15 generates the corrected aberration information $K_i$. The aberration information correction unit 15 calculates Formulas (2) and (3), thereby correcting the aberration information $k_i$ according to the optical conversion information $\beta$ and the spectroscopic characteristic information $\alpha_i$, and generates the corrected aberration information $K_i$. In addition, corrected aberration information $J_i$ obtained by the calculation of Formula (2) is a coefficient which is obtained by the correction of the aberration information $k_i$ according to the optical conversion information $\beta$. In addition, the spectroscopic characteristic information $\alpha_i$ is generated with respect to each of the optical image of a blue component and the optical image of a red component. Formula (3) represents a case where the spectroscopic characteristic information $\alpha_i$ is set for each order.

$$J_i = \frac{k_i}{\beta^{(i-1)}} \tag{2}$$

$$K_i = \alpha_i J_i \tag{3}$$

In addition, the optical image generated in the imaging lens is expanded or contracted by the optical conversion, and thus a relationship between an image height x of the optical image generated in the imaging lens and an image height X of the optical image on an image formation plane of the imaging device is represented by Formula (4). In addition, the corrected aberration information $K_i$ is the aberration information with respect to the image height X, and for example, when the image height X is "$\beta x$", the corrected aberration information $K_i$ becomes equal to the aberration information k.

$$X^i = \beta x^i \tag{4}$$

In addition, processing of steps ST1 to ST3 is not limited to a case of being performed according to the sequence illustrated in FIG. 2, and the processing of step ST2 or the processing of step ST3 may be performed first.

The correction processing unit which performs the aberration correction based on the aberration information performs the calculation of the nth order formula represented by Formula (5) using the corrected aberration information $K_i$ generated in the aberration information correction unit 15, and thereby can calculate a magnification chromatic aberration quantity D which is corrected according to the optical conversion and the spectroscopic characteristic of the imaging device. Thus, by performing the aberration correction based on the magnification chromatic aberration quantity D, it is possible to obtain a good captured image with little aberration.

$$d = \sum_{i=0}^{n} k_i x^i \tag{1}$$

$$D = \sum_{i=0}^{n} K_i X^i \tag{5}$$

Figure 3:
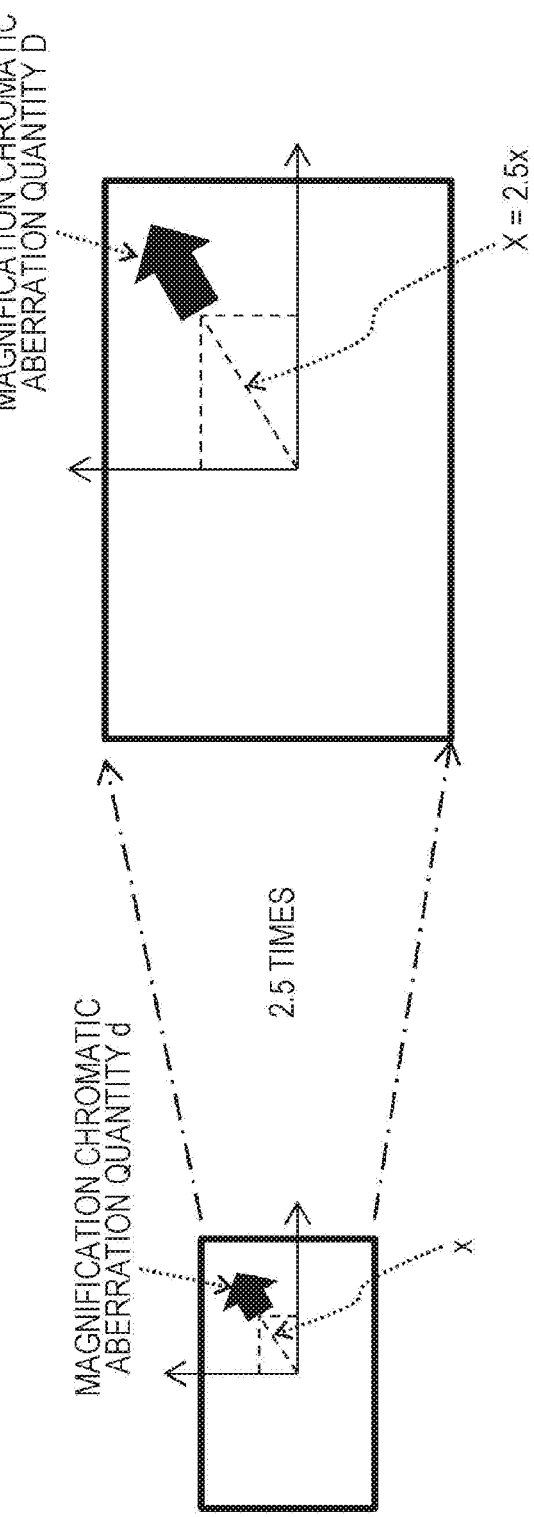
FIG. 3 is a view illustrating a case where an imaging lens that is used for an imaging apparatus in which an imaging device of ⅔ inch type is embedded is used for an imaging apparatus for super 35 mm via an adapter apparatus.

FIG. 3 is a view illustrating a case where the imaging lens that is used for the imaging apparatus in which the imaging device of ⅔ inch type is embedded is used for the imaging apparatus for super 35 mm via the adapter apparatus. In addition, FIG. 3 illustrates a case where the magnification chromatic aberration quantity d can approximate the third order formula. In addition, FIG. 3 illustrates a case where the adapter apparatus expands the optical image which is formed in the imaging lens by, for example, 2.5 times (β=2.5), based on imaging plane sizes of the imaging device of ⅔ inch type and the imaging device which is used for the imaging apparatus for the super 35 mm.

FIG. 3 (A) illustrates a relationship between the image height x and the magnification chromatic aberration quantity d with regard to the optical image which is formed in the imaging lens, and the magnification chromatic aberration quantity d of the image height x is a value which is calculated from Formula (6).

$$d = k_3 x^3 + k_2 x^2 + k_1 x \quad (6)$$

FIG. 3 (B) illustrates a relationship between the image height X and the magnification chromatic aberration quantity D of the imaging plane of the imaging apparatus, and the magnification chromatic aberration quantity D of the image height X (=2.5×) is a value which is calculated from Formula (7). In addition, coefficients K3, K2, K1 of the magnification chromatic aberration quantity D are values which are calculated from Formulas (8) to (10).

$$D = K_3 X^3 + K_2 X^2 + K_1 X \quad (7)$$

$$K_3 = \alpha_3 (k_3 / (2.5)^2) \quad (8)$$

$$K_2 = \alpha_2 (k_2 / 2.5) \quad (9)$$

$$K_1 = \alpha_1 k_1 \quad (10)$$

A magnification (optical conversion information β) of the adapter apparatus is set by using the imaging plane size of the imaging device defined with regard to the aberration information which is acquired from the imaging lens, and the imaging plane size of the imaging device which is used by the imaging apparatus, as a reference. For example, the magnification may be set by the imaging plane size of the imaging device which is used by using the imaging apparatus with respect to the imaging plane size of the defined imaging device, and the adapter apparatus may be set to a magnification lower or higher than a magnification by using the magnification thereof as a reference. For example, if the magnification is lower, an optical image with high brightness may be obtained. In addition, if the magnification is higher, in a case where the adapter apparatus is connected via mount or the like, it is possible to prevent the optical image from becoming smaller than the imaging plane size of the imaging device in the imaging apparatus by means of tolerance of the mount or the like.

2. First Embodiment

Next, a first embodiment will be described. In the first embodiment, a case where an aberration correction apparatus is configured with the adapter apparatus and the imaging apparatus will be described.

2-1. Configuration of First Embodiment

Next, a configuration of the first embodiment will be described. The first embodiment exemplifies a case where the aberration correction apparatus is configured with the adapter apparatus and the imaging apparatus.

Figure 4:
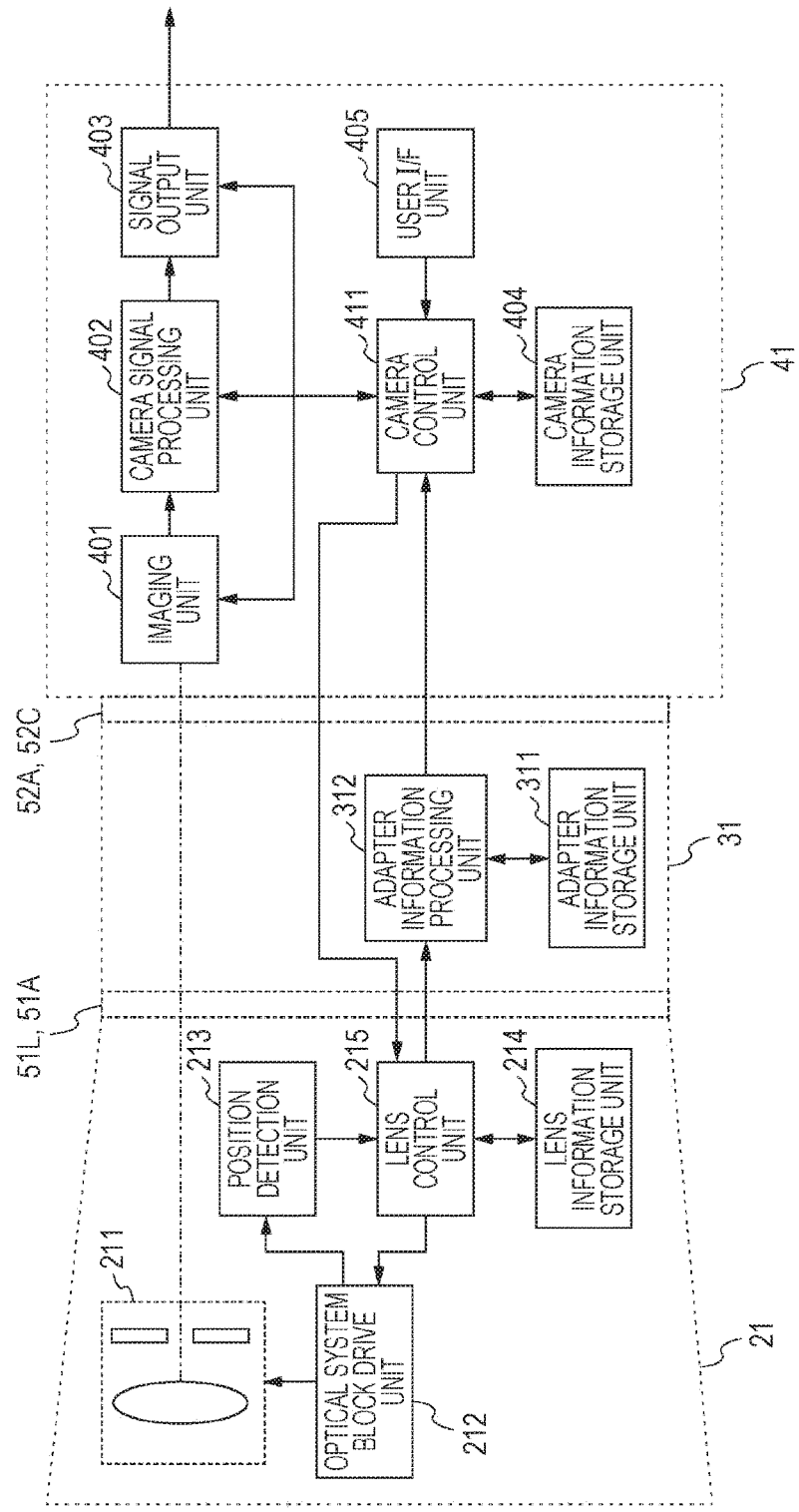
FIG. 4 is a diagram illustrating a configuration of a first embodiment.

FIG. 4 illustrates the configuration of the first embodiment. An imaging system 20 is configured with an imaging lens 21, an adapter apparatus 31, and an imaging apparatus 41.

The imaging lens 21 includes an optical system block 211, an optical system block drive unit 212, a position detection unit 213, a lens information storage unit 214, and a lens control unit 215.

The optical system block 211 includes a lens group for generating a subject optical image, an aperture adjustment mechanism, or the like. In addition, a shutter mechanism, camera shake correction mechanism, or the like may be provided in the optical system block 211.

The optical system block drive unit 212 drives a lens group based on a control signal from the lens control unit 215, thereby performing a focus operation or a zoom operation. In addition, the optical system block drive unit 212 operates the aperture adjustment mechanism based on a control signal from the lens control unit 215, thereby adjusting the brightness of the subject optical image.

The position detection unit 213 detects a lens position of the lens group in the optical system block 211, or an adjustment position of the aperture adjustment mechanism. The position detection unit 213 outputs a position detection result to the lens control unit 215.

The lens information storage unit 214 stores aberration information for each focus position, lens position or the like. The lens information storage unit 214 stores the coefficient $K_i$ of Formula (1) as the aberration information, for example, the magnification chromatic aberration information with regard to each of the optical image of a blue component and the optical image of a red component for each focus distance, lens position, or the like.

The lens control unit 215 communicates with a camera control unit 411 of the imaging apparatus 41, and generates the control signal using the position detection result or the like and outputs the control signal to the optical system block drive unit 212, in such a manner that the focus operation, the zoom operation, an exposure control, or the like is performed by the imaging lens 21 according to the instruction of the camera control unit 411. In addition, the lens control unit 215 reads the aberration information, for example, the aberration information $k_i$ of a current focus distance or the like from the lens information storage unit 214 according to a request of the adapter apparatus 31, and outputs the aberration information to the requestor.

The adapter apparatus 31 includes an adapter information storage unit 311 and an adapter information processing unit 312.

The adapter information storage unit 311 stores optical conversion information β with regard to an optical conversion which is performed by the adapter apparatus 31.

When performing the optical conversion, the adapter information processing unit 312 performs correction processing based on the optical conversion information with respect to the aberration information acquired from the imaging lens 21, and outputs the corrected aberration information to the imaging apparatus 41.

The imaging apparatus 41 includes an imaging unit 401, a camera signal processing unit 402, a signal output unit 403, a camera information storage unit 404, and a camera control unit 411.

The imaging unit 401 is configured with an imaging device such as a charge coupled device (CCD) sensor or a complementary metal oxide semiconductor (CMOS) sensor. The imaging unit 401 converts a subject optical image formed on the image formation plane of the imaging device into an image signal, and outputs the image signal to the camera signal processing unit 402.

The camera signal processing unit 402 performs various signal processing with respect to the image signal. For example, the camera signal processing unit 402 performs a preceding stage signal processing such as black level correction or gain correction which is performed by using the image signal generated by the imaging unit 401, and performs aberration correction processing which is performed by using the image signal in which the preceding stage signal processing is performed. In addition, the camera signal processing unit 402 performs subsequent stage signal processing such as color conversion or gamma correction which is performed by using the image signal in which the aberration correction processing is performed, and outputs the processing result to the signal output unit 403.

The signal output unit 403 performs signal processing corresponding to display or recording reproduction with regard to the image signal supplied from the camera signal processing unit 402, and outputs the processed signal to an external device or the like as a signal with a predetermined format. For example, the signal output unit 403 performs a size conversion or the like with respect to the image signal so as to be an image size corresponding to a display unit (not illustrated) and outputs the image signal. In addition, the signal output unit 403 performs encoding processing of the image signal, for example, image compression processing performed by an encoding method such as a moving picture experts group (MPEG), H.264/AVC, or H.265/HEVC, and outputs the obtained encoding data to the external device or the like.

The camera information storage unit 404 stores information indicating characteristics of the imaging apparatus 41, various setting states, or the like.

The user interface (I/F) unit 405 is configured with a manipulation switch or the like, generates a manipulation signal according to a user's manipulation, and outputs the manipulation signal to the camera control unit 411.

The camera control unit 411 is configured with a central processing unit (CPU), a read only memory (ROM), a random access memory (RAM), or the like. The camera control unit 411 executes a program which is stored in the ROM or the RAM, and generates the control signal based on the manipulation signal from the user interface unit 405 or the information which is stored in the camera information storage unit 404. The camera control unit 411 supplies the generated control signal to each unit, and thereby each unit is controlled in such a manner that operations according to the user's manipulation are performed in the imaging apparatus 41. In addition, the camera control unit 411 performs the correction according to the spectroscopic characteristic of the imaging device with respect to the corrected aberration information acquired from the adapter apparatus 31, and calculates the aberration quantity based on the corrected aberration information. Furthermore, the camera control unit 411 outputs the calculated aberration quantity to the camera signal processing unit 402, and the aberration correction processing is performed by the camera signal processing unit 402 in such a manner that the calculated aberration quantity is corrected.

A connection of the imaging lens 21 and the adapter apparatus 31 is performed via a mount 51L on a lens side provided in the imaging lens 21 and via a mount 51A on an adapter side provided in the adapter apparatus 31. In addition, a connection of the adapter apparatus 31 and the imaging apparatus 41 is performed via a mount 52A on an adapter side provided in the adapter apparatus 31 and via a mount 52C on a camera sided provided in the imaging apparatus 41. In addition, the adapter apparatus 31 and the imaging apparatus 41 may perform various information communications via a communication path provided separately from the mounts, and this is the same as in the embodiments described later. In this way, if the communication path, for example, a communication cable, is provided separately from the mount, it is possible to perform easy communication of various information between the adapter apparatus 31 and the imaging apparatus 41, without changing the mount.

As described above, in the first embodiment, the function of the aberration information acquisition unit, the function of the optical conversion information acquisition unit, and a partial function of the aberration information correction unit are provided in the adapter information processing unit 312, and the function of the spectroscopic characteristic information acquisition unit and another function of the aberration information correction unit are provided in the camera control unit 411.

2-2. Operation of First Embodiment

Figure 5:
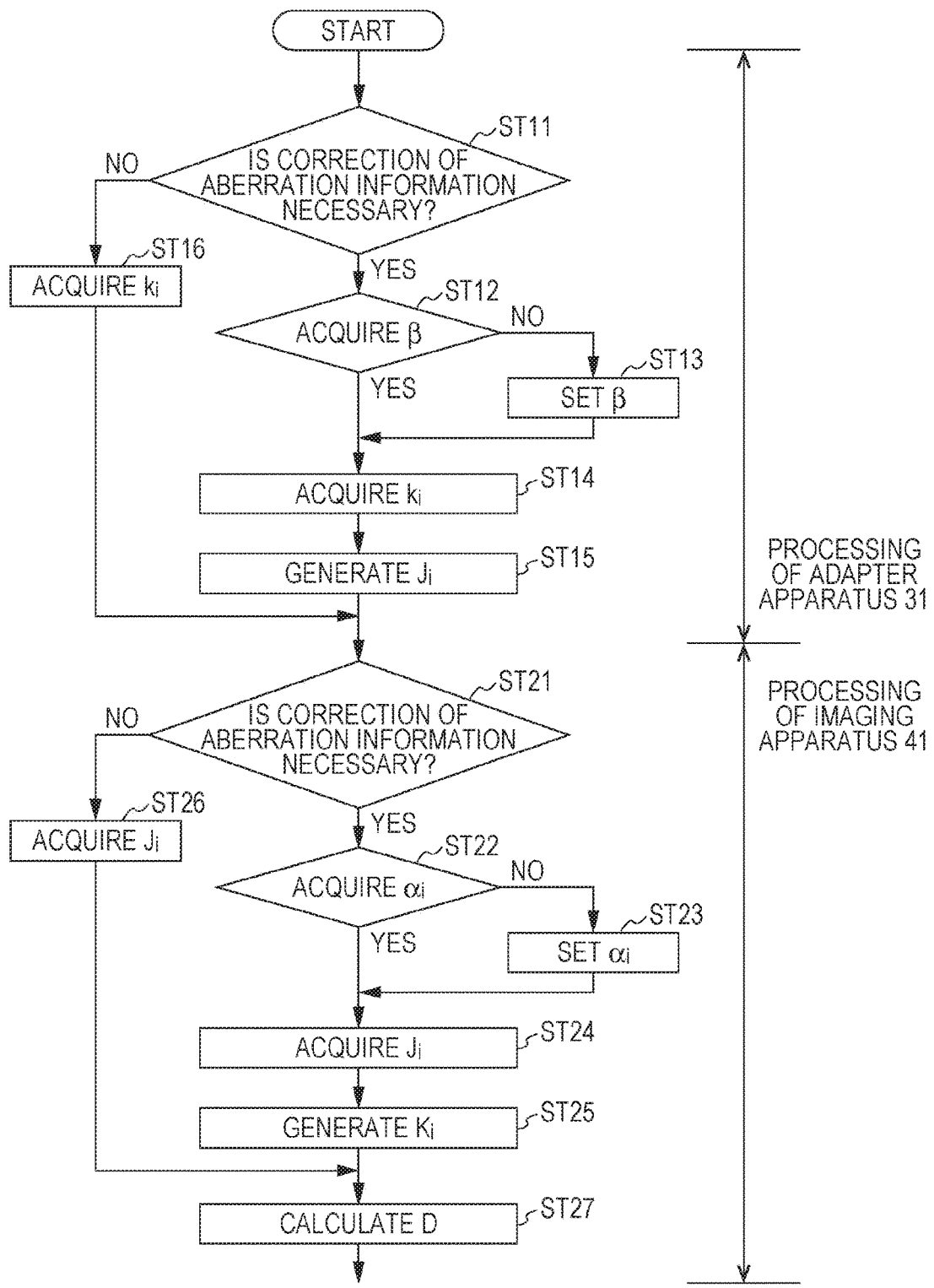
FIG. 5 is a flow chart illustrating an operation of the first embodiment.

Next, an operation of the first embodiment will be described. FIG. 5 is a flow chart illustrating the operation of the first embodiment.

In step ST11, the adapter information processing unit 312 determines whether or not the correction of the aberration information is necessary. In a case where the optical conversion is performed by the adapter apparatus 31, the adapter information processing unit 312 determines that the correction of the aberration information is necessary, and proceeds to step ST12. In addition, the optical conversion is not performed, and the adapter information processing unit 312 determines that the correction of the aberration information is not necessary, and proceeds to step ST16.

In step ST12, the adapter information processing unit 312 acquires the optical conversion information $\beta$. The adapter information processing unit 312 acquires the optical conversion information $\beta$ stored in, for example, the adapter information storage unit 311, and proceeds to step ST14. In addition, in a case where the optical conversion information $\beta$ is not acquired, or a case where the acquired optical conversion information $\beta$ is modified and newly set, the adapter information processing unit 312 proceeds to step ST13.

In step ST13, the adapter information processing unit 312 sets the optical conversion information $\beta$. The adapter information processing unit 312 sets the optical conversion information $\beta$ based on an instruction from the external device, the user, or the like, for example, and proceeds to step ST14.

In step ST14, the adapter information processing unit 312 acquires aberration information $k_i$. The adapter information processing unit 312 acquires the aberration information $k_i$ from the imaging lens 21, and proceeds to step ST15.

In step ST15, the adapter information processing unit 312 generates corrected aberration information $J_i$. The adapter information processing unit 312 performs the correction processing of the aberration information $k_i$ represented in Formula (2) based on the optical conversion information $\beta$, generates the corrected aberration information $J_i$, and proceeds to step ST21.

In step ST16, the adapter information processing unit 312 acquires the aberration information $k_i$. The adapter information processing unit 312 acquires the aberration information $k_i$ from the imaging lens 21, and proceeds to step ST21. In addition, the corrected aberration information $J_i$ in which the correction of the aberration information is not performed is the same as the aberration information $k_i$.

In step ST21, the camera control unit 411 determines whether or not the correction of the aberration information is necessary. In a case where the spectroscopic characteristic of the imaging device is different from the reference spectroscopic characteristic, the camera control unit 411 determines that the correction of the aberration information is necessary, and thereby proceeds to step ST22. In addition, in a case where the spectroscopic characteristic of the imaging device is the same as the reference spectroscopic characteristic, the camera control unit 411 determines that the correction of the aberration information is not necessary, and thereby proceeds to step ST26. In addition, whether or not the correction based on the spectroscopic characteristic with respect to the aberration information is performed in the imaging apparatus 41 is determined based on the instruction of the user with respect to the imaging apparatus 41, or on a storage state of the spectroscopic characteristic information $\alpha_i$ of the imaging apparatus 41, for example.

In step ST22, the camera control unit 411 acquires the spectroscopic characteristic information $\alpha_i$. The camera control unit 411 acquires the spectroscopic characteristic information $\alpha_i$ stored in the camera information storage unit 404, for example, and proceeds to step ST24. In addition, in a case where it is difficult to acquire the spectroscopic characteristic information $\alpha_i$, or a case where the acquired spectroscopic characteristic information $\alpha_i$ is changed and newly set, the camera control unit 411 proceeds to step ST23.

In step ST23, the camera control unit 411 sets the spectroscopic characteristic information $\alpha_i$. The camera control unit 411 sets the spectroscopic characteristic information $\alpha_i$ based on the instruction from the user, the external device, or the like, for example, and proceeds to step ST24.

In step ST24, the camera control unit 411 acquires the corrected aberration information $J_i$. The camera control unit 411 acquires the corrected aberration information $J_i$ from the adapter apparatus 31, and proceeds to step ST25. In addition, a case where the correction of the aberration information is not performed in the adapter apparatus 31, corresponds to "$\beta=1$ (magnification is 1)". Thus, even if the aberration information $k_i$ is supplied from the adapter apparatus 31, the camera control unit 411 uses it as the corrected aberration information $J_i$.

In step ST25, the camera control unit 411 generates the corrected aberration information $K_i$. The camera control unit 411 performs the correction of the corrected aberration information $J_i$ represented in Formula (3) based on the spectroscopic characteristic information $\alpha_i$, thereby generating the corrected aberration information $K_i$. The camera control unit 411 generates the corrected aberration information $K_i$ and proceeds to step ST27.

In step ST26, the camera control unit 411 acquires the corrected aberration information $J_i$. The camera control unit 411 acquires the corrected aberration information $J_i$ from the adapter apparatus 31, and proceeds to step ST27. In addition, since the correction of the aberration information is not necessary, the camera control unit 411 uses the corrected aberration information $J_i$ as the corrected aberration information $K_i$.

In step ST27, the camera control unit 411 calculates the magnification chromatic aberration quantity D. The camera control unit 411 performs the calculation represented in Formula (5) using the corrected aberration information $K_i$, calculates the magnification chromatic aberration quantity D of the image height X, and outputs the calculated magnification chromatic aberration quantity D to the camera signal processing unit 402 which is a correction processing unit that performs the aberration correction. In addition, the calculation of the magnification chromatic aberration quantity D may be performed by the camera signal processing unit 402.

According to such a first embodiment, even if an imaging device with a spectroscopic characteristic different from the spectroscopic characteristic which is assumed by imaging lens is used for the imaging apparatus, the correction of the aberration information in which a difference of the spectroscopic characteristic is considered is performed. Thus, if the aberration correction is performed using the corrected aberration information, it is possible to obtain a good captured image with little aberration, for example.

In addition, in a case where it is difficult to acquire the spectroscopic characteristic information, it is possible to set the spectroscopic characteristic information and to change the acquired spectroscopic characteristic information, and in a case where it is difficult to acquire the optical conversion information, it is possible to set the optical conversion information and to change the acquired optical conversion information. Thus, it is possible to control the correction of the aberration information in such a manner that the good captured image with little aberration is obtained.

3. Second Embodiment (Case where Aberration Correction Apparatus is Configured by Adapter Apparatus)

Next, a configuration of a second embodiment will be described. In the second embodiment, a case where the aberration correction apparatus is configured by the adapter apparatus will be described.

3-1. Configuration of Second Embodiment

Figure 6:
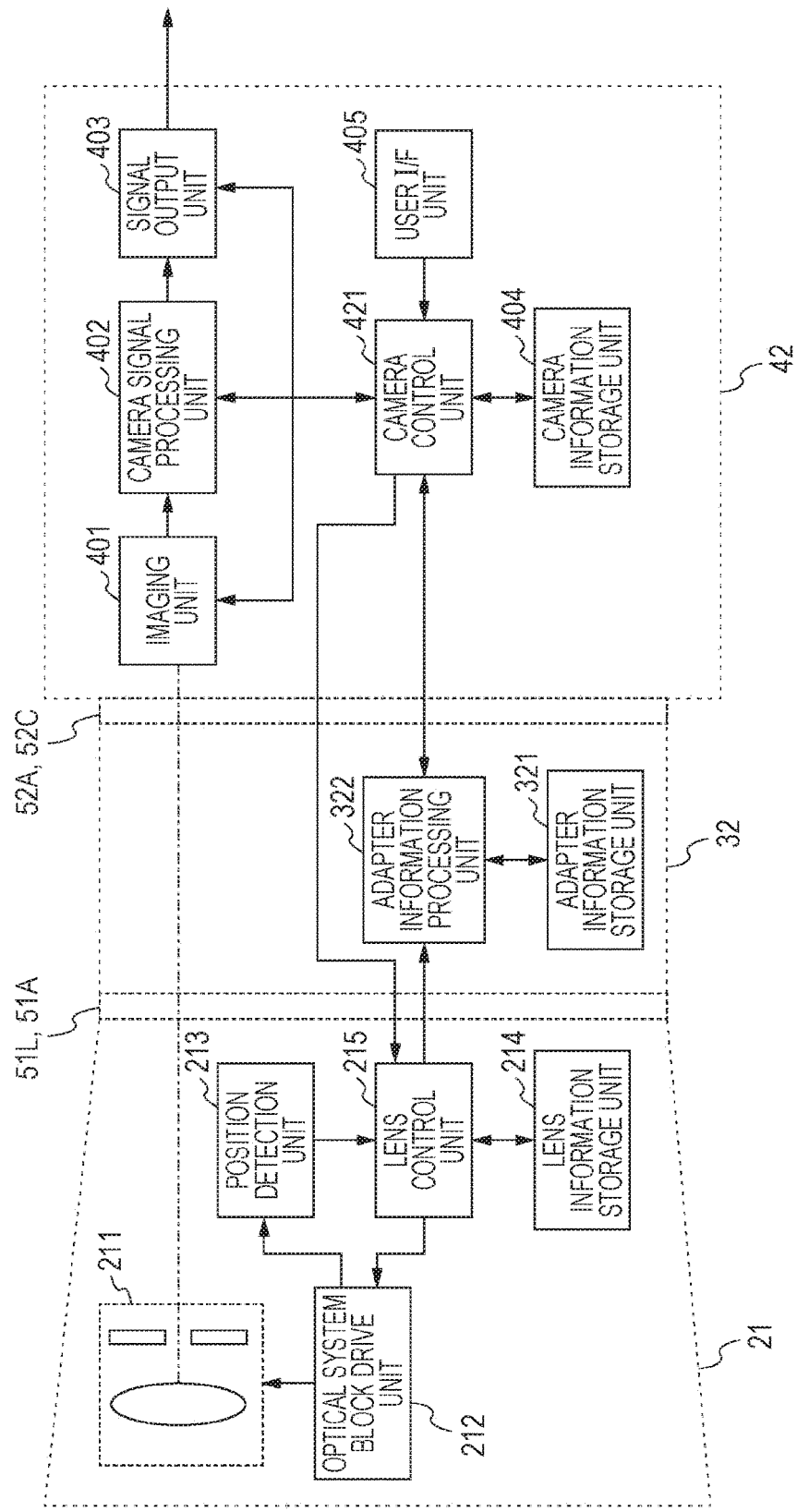
FIG. 6 is a diagram illustrating a configuration of a second embodiment.

FIG. 6 illustrates a configuration of a second embodiment. The imaging system 20 is configured with the imaging lens 21, an adapter apparatus 32, and an imaging apparatus 42.

The imaging lens 21 includes the optical system block 211, the optical system block drive unit 212, the position detection unit 213, the lens information storage unit 214, and the lens control unit 215.

The optical system block 211 includes a lens group for generating a subject optical image, an aperture adjustment mechanism, or the like. In addition, a shutter mechanism, camera shake correction mechanism, or the like may be provided in the optical system block 211.

The optical system block drive unit 212 drives a lens group based on a control signal from the lens control unit 215, thereby performing a focus operation or a zoom operation. In addition, the optical system block drive unit 212 operates the aperture adjustment mechanism based on a control signal from the lens control unit 215, thereby adjusting the brightness of the subject optical image.

The position detection unit 213 detects a lens position of the lens group in the optical system block 211, or an adjustment position of the aperture adjustment mechanism. The position detection unit 213 outputs a position detection result to the lens control unit 215.

The lens information storage unit 214 stores aberration information for each focus position, lens position or the like. The lens information storage unit 214 stores the coefficient $K_i$ of Formula (1) as the aberration information, for example, the magnification chromatic aberration information with regard to each of the optical image of a blue component and the optical image of a red component for each focus distance, lens position, or the like.

The lens control unit 215 communicates with a camera control unit 421 of the imaging apparatus 42, and generates the control signal using the position detection result or the like and outputs the control signal to the optical system block drive unit 212, in such a manner that the focus operation, the zoom operation, an exposure control, or the like is performed by the imaging lens 21 according to the instruction of the camera control unit 421. In addition, the lens control unit 215 reads the aberration information, for example, the aberration information $k_i$ of a current focus distance or the like from the lens information storage unit 214 according to a request of the adapter apparatus 32, and outputs the aberration information to the requestor.

The adapter apparatus 32 includes an adapter information storage unit 321 and an adapter information processing unit 322.

The adapter information storage unit 321 stores optical conversion information β with regard to an optical conversion which is performed by the adapter apparatus 32.

When performing the optical conversion, the adapter information processing unit 322 performs correction processing based on the optical conversion information with respect to the aberration information acquired from the imaging lens 21. In addition, the adapter information processing unit 322 acquires the spectroscopic characteristic information from the imaging apparatus 42, and performs the correction processing based on the spectroscopic characteristic information with respect to the aberration information acquired from the imaging lens 21. The adapter information processing unit 322 outputs the optical conversion information and the corrected aberration information to the imaging apparatus 42.

The imaging apparatus 42 includes an imaging unit 401, a camera signal processing unit 402, a signal output unit 403, a camera information storage unit 404, and a camera control unit 421.

The imaging unit 401 is configured with an imaging device such as a charge coupled device (CCD) sensor or a complementary metal oxide semiconductor (CMOS) sensor. The imaging unit 401 converts a subject optical image formed on the image formation plane of the imaging device into an image signal, and outputs the image signal to the camera signal processing unit 402.

The camera signal processing unit 402 performs various signal processing with respect to the image signal. For example, the camera signal processing unit 402 performs a preceding stage signal processing such as black level correction or gain correction which is performed by using the image signal generated by the imaging unit 401, and performs aberration correction processing which is performed by using the image signal in which the preceding stage signal processing is performed. In addition, the camera signal processing unit 402 performs subsequent stage signal processing such as color conversion or gamma correction which is performed by using the image signal in which the aberration correction processing is performed, and outputs the processing result to the signal output unit 403.

The signal output unit 403 performs signal processing corresponding to display or recording reproduction with regard to the image signal supplied from the camera signal processing unit 402, and outputs the processed signal to an external device or the like as a signal with a predetermined format. For example, the signal output unit 403 performs a size conversion or the like with respect to the image signal so as to be an image size corresponding to a display unit (not illustrated) and outputs the image signal. In addition, the signal output unit 403 performs encoding processing of the image signal, for example, image compression processing performed by an encoding method such as a moving picture experts group (MPEG), H.264/AVC, or H.265/HEVC, and outputs the obtained encoding data or the like to the external device or the like.

The camera information storage unit 404 stores information indicating characteristics of the imaging apparatus 42, various setting states, or the like.

The user interface (I/F) unit 405 is configured with a manipulation switch or the like, generates a manipulation signal according to a user's manipulation, and outputs the manipulation signal to the camera control unit 421.

The camera control unit 421 is configured with a central processing unit (CPU), a read only memory (ROM), a random access memory (RAM), or the like. The camera control unit 421 executes a program which is stored in the ROM or the RAM, and generates the control signal based on the manipulation signal from the user interface unit 405 or the information which is stored in the camera information storage unit 404. The camera control unit 421 supplies the generated control signal to each unit, and thereby each unit is controlled in such a manner that operations according to the user's manipulation are performed in the imaging apparatus 42. In addition, the camera control unit 421 calculates the aberration quantity based on the optical conversion information acquired from the adapter apparatus 32 and the corrected aberration information. The camera control unit 421 outputs the calculated aberration quantity to the camera signal processing unit 402, and the aberration correction processing is performed by the signal processing unit 402 in such a manner that the calculated aberration quantity is corrected.

A connection of the imaging lens 21 and the adapter apparatus 32 is performed via a mount 51L on a lens side provided in the imaging lens 21 and via a mount 51A on an adapter side provided in the adapter apparatus 32. In addition, a connection of the adapter apparatus 32 and the imaging apparatus 42 is performed via a mount 52A on an adapter side provided in the adapter apparatus 32 and via a mount 52C on a camera sided provided in the imaging apparatus 42.

As described above, in the second embodiment, the function of the aberration information acquisition unit, the function of the optical conversion information acquisition unit, the function of spectroscopic characteristic information acquisition unit, and the function of the aberration information correction unit are provided in the adapter information processing unit 322.

3-2. Operation of Second Embodiment

Figure 7:
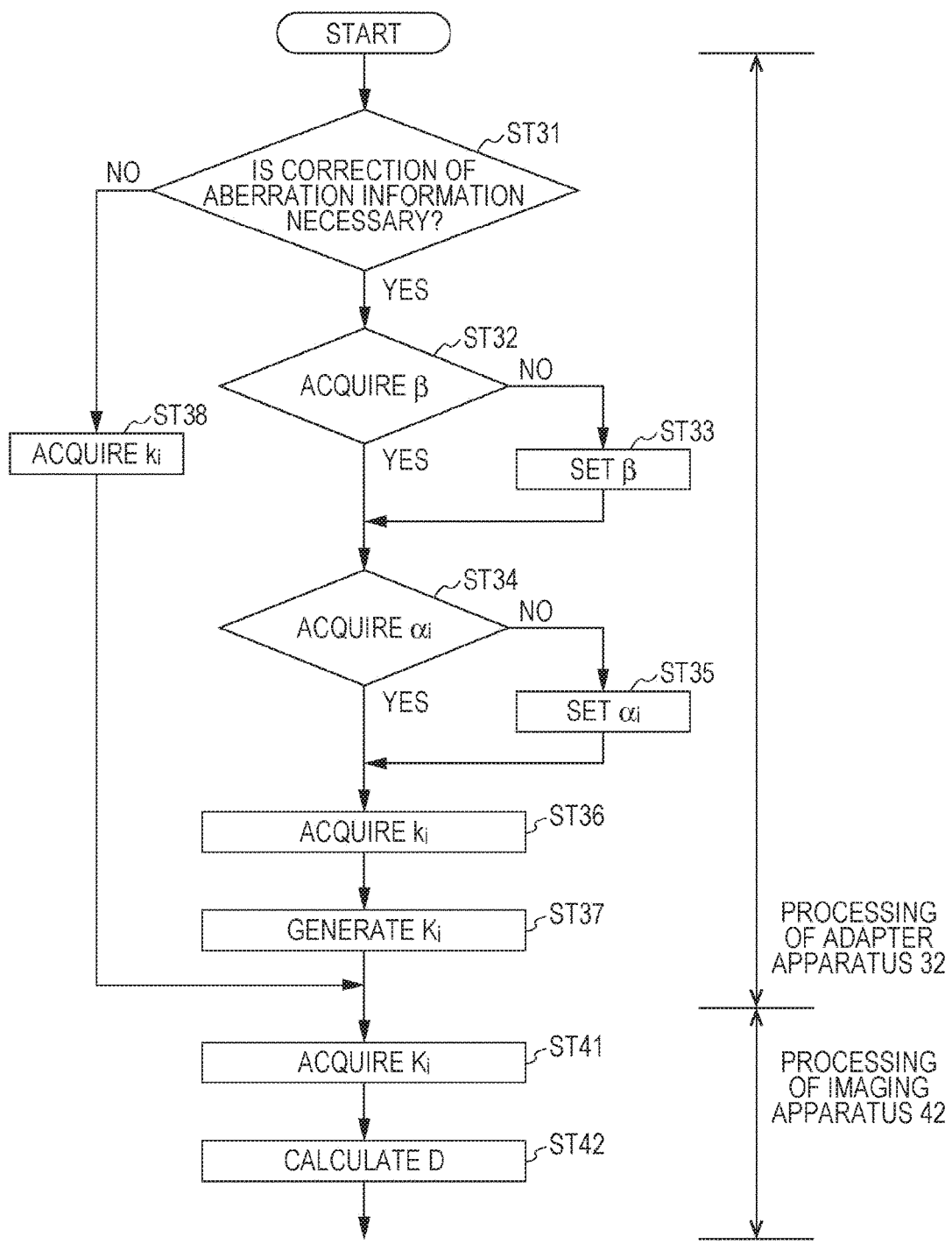
FIG. 7 is a flow chart illustrating an operation of the second embodiment.

Next, an operation of the second embodiment will be described. FIG. 7 is a flow chart illustrating the operation of the second embodiment.

In step ST31, the adapter information processing unit 322 determines whether or not the correction of the aberration information is necessary. In a case where the optical conversion is performed by the adapter apparatus 32, and/or a case where the correction according to the spectroscopic characteristic of the imaging device is performed, the adapter information processing unit 322 determines that the correction of the aberration information is necessary, and proceeds to step ST32. In addition, in a case where the correction according to the optical conversion and the spectroscopic characteristic of the imaging device are not performed, the adapter information processing unit 322 determines that the correction of the aberration information is not necessary, and proceeds to step ST38. In addition, whether or not the correction according to the spectroscopic characteristic of the imaging device is performed in the adapter apparatus 32, is determined based on the instruction from the user or the imaging apparatus 42, for example.

In step ST32, the adapter information processing unit 322 acquires the optical conversion information $\beta$. The adapter information processing unit 322 acquires the optical conversion information $\beta$ stored in, for example, the adapter information storage unit 321, and proceeds to step ST34. In addition, in a case where the optical conversion information $\beta$ is not acquired, or a case where the acquired optical conversion information $\beta$ is changed and newly set, the adapter information processing unit 322 proceeds to step ST33.

In step ST33, the adapter information processing unit 322 sets the optical conversion information $\beta$. The adapter information processing unit 322 sets the optical conversion information $\beta$ based on an instruction from the external device, the user, or the like, for example, and proceeds to step ST34.

In step ST34, the adapter information processing unit 322 acquires the spectroscopic characteristic information $\alpha_i$. The adapter information processing unit 322 acquires the spectroscopic characteristic information $\alpha_i$ stored in the camera information storage unit 404 of the imaging apparatus 42, for example, and proceeds to step ST36. In addition, in a case where it is difficult to acquire the spectroscopic characteristic information $\alpha_i$, or a case where the acquired spectroscopic characteristic information $\alpha_i$ is changed and newly set, the adapter information processing unit 322 proceeds to step ST35.

In step ST35, the adapter information processing unit 322 sets the spectroscopic characteristic information $\alpha_i$. The adapter information processing unit 322 sets the spectroscopic characteristic information $\alpha_i$ based on the instruction from the user or the external device, for example, and proceeds to step ST36.

In step ST36, the adapter information processing unit 322 acquires the aberration information $k_i$. The adapter information processing unit 322 acquires the aberration information $k_i$ from the imaging lens 21, and proceeds to step ST37.

In step ST37, the adapter information processing unit 322 generates the corrected aberration information $K_i$. The adapter information processing unit 322 performs the correction processing of the aberration information $k_i$ represented in Formula (2) based on the optical conversion information $\beta$, and generates the corrected aberration information $J_i$. Furthermore, the adapter information processing unit 322 performs the correction processing of the corrected aberration information $J_i$ represented in Formula (3) based on the optical conversion information $\alpha_i$, generates the corrected aberration information $K_i$, and proceeds to step ST41.

In step ST38, the adapter information processing unit 322 acquires the aberration information $k_i$. The adapter information processing unit 322 acquires the aberration information $k_i$ from the imaging lens 21, and proceeds to step ST41. In addition, the corrected aberration information $K_i$ in which the correction of the aberration information is not performed is the same as the aberration information $k_i$.

In step ST41, the camera control unit 421 acquires the corrected aberration information $K_i$. The camera control unit 421 acquires the corrected aberration information $K_i$ from the adapter apparatus 32, and proceeds to step ST42.

In step ST42, the camera control unit 421 calculates the magnification chromatic aberration quantity D. The camera control unit 421 performs the calculation represented in Formula (5) using the corrected aberration information $K_i$, calculates the magnification chromatic aberration quantity D of the image height X, and outputs the calculated magnification chromatic aberration quantity D to the camera signal processing unit 402 which is a correction processing unit that performs the aberration correction. In addition, the calculation of the magnification chromatic aberration quantity D may be performed by the camera signal processing unit 402.

According to such a second embodiment, even if an imaging device with a spectroscopic characteristic different from the spectroscopic characteristic which is assumed by imaging lens is used for the imaging apparatus, the correction of the aberration information in which a difference of the spectroscopic characteristic is considered is performed. Thus, if the aberration correction is performed using the corrected aberration information, it is possible to obtain a good captured image with little aberration, for example. In addition, since the spectroscopic characteristic information can be set or changed, and the optical conversion information can be set or changed, it is possible to control the correction of the aberration information in such a manner that a good captured image with little aberration is obtained.

Furthermore, since the generation of the corrected aberration information $K_i$ is performed in the adapter apparatus 32, it is possible to reduce a load of the camera control unit 421.

4. Third Embodiment (Case where Aberration Correction Apparatus is Configured by Imaging Apparatus)

Next, a configuration of a third embodiment will be described. In the third embodiment, a case where the aberration correction apparatus is configured by the imaging apparatus will be described.

4-1. Configuration of Third Embodiment

Figure 8:
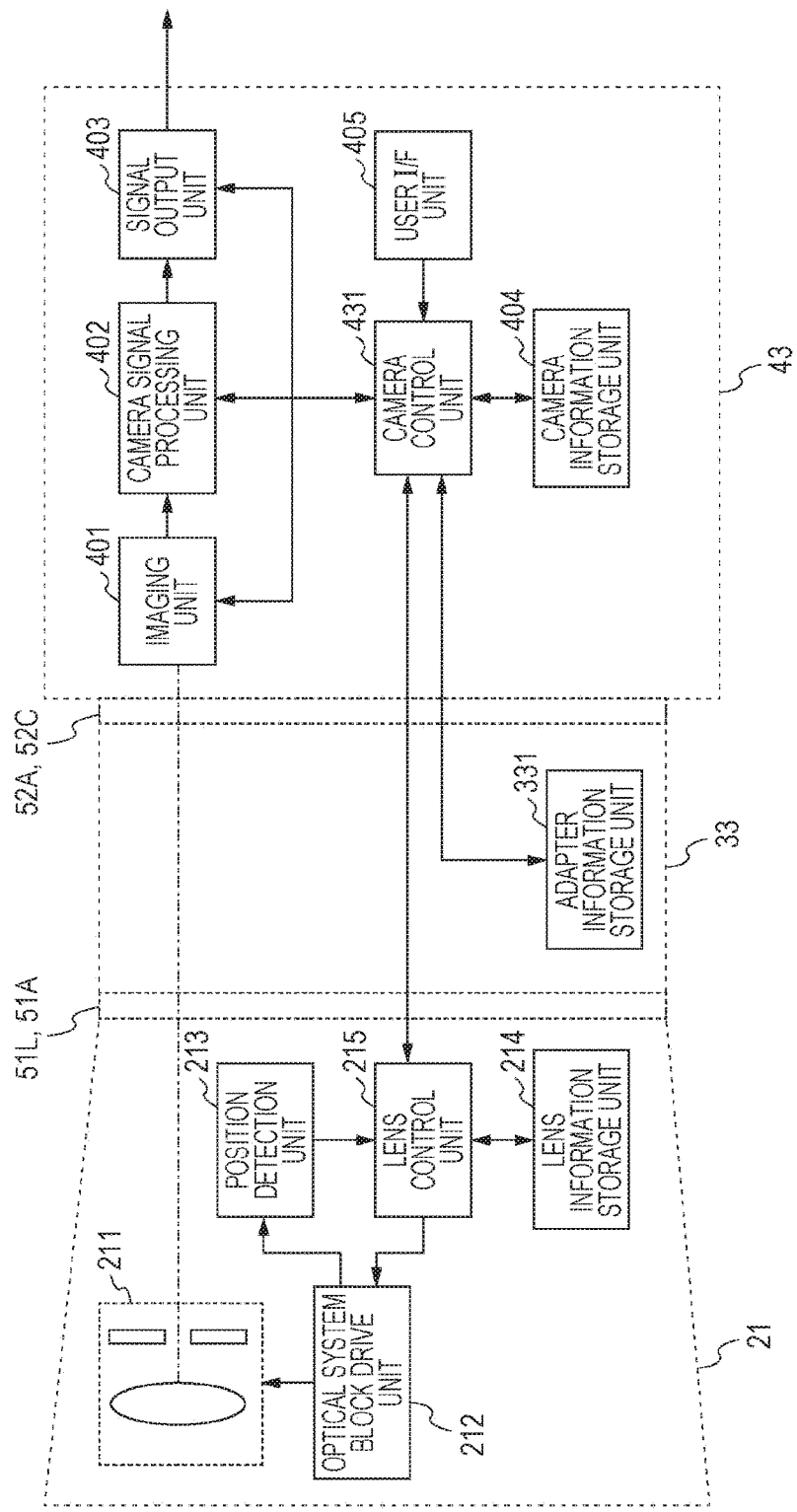
FIG. 8 is a diagram illustrating a configuration of a third embodiment.

FIG. 8 illustrates a configuration of a third embodiment. The imaging system 20 is configured with the imaging lens 21, an adapter apparatus 33, and an imaging apparatus 43.

The imaging lens 21 includes the optical system block 211, the optical system block drive unit 212, the position detection unit 213, the lens information storage unit 214, and the lens control unit 215.

The optical system block 211 includes a lens group for generating a subject optical image, an aperture adjustment mechanism, or the like. In addition, a shutter mechanism, camera shake correction mechanism, or the like is provided in the optical system block 211.

The optical system block drive unit 212 drives a lens group based on a control signal from the lens control unit 215, thereby performing a focus operation or a zoom operation. In addition, the optical system block drive unit 212 drives the aperture adjustment mechanism based on a control signal from the lens control unit 215, thereby adjusting the brightness of the subject optical image.

The position detection unit 213 detects a lens position of the lens group in the optical system block 211, or an adjustment position of the aperture adjustment mechanism. The position detection unit 213 outputs a position detection result to the lens control unit 215.

The lens information storage unit 214 stores aberration information for each focus position, lens position or the like. The lens information storage unit 214 stores the coefficient $K_i$ of Formula (1) as the aberration information, for example, the magnification chromatic aberration information with regard to each of the optical image of a blue component and the optical image of a red component for each focus distance, lens position, or the like.

The lens control unit 215 communicates with a camera control unit 431 of the imaging apparatus 43, and generates the control signal using the position detection result or the like and outputs the control signal to the optical system block drive unit 212, in such a manner that the focus operation, the zoom operation, an exposure control, or the like is performed by the imaging lens 21 according to the instruction of the camera control unit 431. In addition, the lens control unit 215 reads the aberration information, for example, the aberration information $k_i$ of a current focus distance or the like from the lens information storage unit 214 according to a request of the adapter apparatus 33, and outputs the aberration information to the requestor.

The adapter apparatus 33 includes an adapter information storage unit 331. The adapter information storage unit 331 stores the optical conversion information $\beta$ with regard to the optical conversion performed by the adapter apparatus 33. The adapter information storage unit 331 outputs the optical conversion information $\beta$ to the imaging apparatus 43.

The imaging apparatus 43 includes the imaging unit 401, the camera signal processing unit 402, the signal output unit 403, the camera information storage unit 404, and the camera control unit 431.

The imaging unit 401 is configured with an imaging device such as a charge coupled device (CCD) sensor or a complementary metal oxide semiconductor (CMOS) sensor. The imaging unit 401 converts a subject optical image formed on the image formation plane of the imaging device into an image signal, and outputs the image signal to the camera signal processing unit 402.

The camera signal processing unit 402 performs various signal processing with respect to the image signal. For example, the camera signal processing unit 402 performs a preceding stage signal processing such as black level correction or gain correction which is performed by using the image signal generated by the imaging unit 401, and performs aberration correction processing which is performed by using the image signal in which the preceding stage signal processing is performed. In addition, the camera signal processing unit 402 performs subsequent stage signal processing such as color conversion or gamma correction which is performed by using the image signal in which the aberration correction processing is performed, and outputs the processing result to the signal output unit 403.

The signal output unit 403 performs signal processing corresponding to display or recording reproduction with regard to the image signal supplied from the camera signal processing unit 402, and outputs the processed signal to an external device or the like as a signal with a predetermined format. For example, the signal output unit 403 performs a size conversion or the like with respect to the image signal so as to be an image size corresponding to a display unit (not illustrated) and outputs the image signal. In addition, the signal output unit 403 performs encoding processing of the image signal, for example, image compression processing performed by an encoding method such as a moving picture experts group (MPEG), H.264/AVC, or H.265/HEVC, and outputs the obtained encoding data or the like to the external device or the like.

The camera information storage unit 404 stores information indicating characteristics of the imaging apparatus 43, various setting states, or the like.

The user interface (I/F) unit 405 is configured with a manipulation switch or the like, generates a manipulation signal according to a user's manipulation, and outputs the manipulation signal to the camera control unit 431.

The camera control unit 431 is configured with a central processing unit (CPU), a read only memory (ROM), a random access memory (RAM), or the like. The camera control unit 431 executes a program which is stored in the ROM or the RAM, and generates the control signal based on the manipulation signal from the user interface unit 405 or the information which is stored in the camera information storage unit 404. The camera control unit 431 supplies the generated control signal to each unit, and thereby each unit is controlled in such a manner that operations according to the user's manipulation are performed in the imaging apparatus 43. In addition, the camera control unit 431 calculates the corrected aberration information $K_i$, based on the aberration information $k_i$ acquired from the imaging lens 21, the optical conversion information $\beta$, acquired from the adapter apparatus 33, and the spectroscopic characteristic information $\alpha_i$ stored in the camera information storage unit 404. In addition, the camera control unit 431 calculates an aberration quantity using the corrected aberration information $K_i$, and outputs the calculated aberration quantity to the camera signal processing unit 402. The camera signal processing unit 402 performs the aberration correction processing in such a manner that the calculated aberration quantity is corrected.

A connection of the imaging lens 21 and the adapter apparatus 33 is performed via a mount 51L on a lens side provided in the imaging lens 21 and via a mount 51A on an adapter side provided in the adapter apparatus 33. In addition, a connection of the adapter apparatus 33 and the imaging apparatus 43 is performed via a mount 52A on an adapter side provided in the adapter apparatus 33 and via a mount 52C on a camera side provided in the imaging apparatus 43.

As described above, in the third embodiment, the function of the aberration information acquisition unit, the function of the optical conversion information acquisition unit, the function of spectroscopic characteristic information acquisition unit, and the function of the aberration information correction unit are provided in the camera control unit 431.

4-2. Operation of Third Embodiment

Next, an operation of the third embodiment will be described. FIG. 9 is a flow chart illustrating the operation of the third embodiment.

In step ST51, the camera control unit 431 determines whether or not the correction of the aberration information is necessary. In a case where the optical conversion and/or the correction according to the spectroscopic characteristic of the imaging device is performed, the camera control unit 431 determines that the correction of the aberration information is necessary, and proceeds to step ST52. In addition, in a case where the optical conversion and the correction according to the spectroscopic characteristic of the imaging device are not performed, the camera control unit 431 determines that the correction of the aberration information is not necessary, and proceeds to step ST58. In addition, whether or not the optical conversion with respect to the aberration information and/or the correction according to the spectroscopic characteristic of the imaging device is performed by the imaging apparatus 43, is determined based on the user's instruction with respect to the imaging apparatus 43, a storage state of the spectroscopic characteristic information $\alpha_i$ in the imaging apparatus 43, a storage state of the optical conversion information $\beta$ in the adapter apparatus 33, or the like, for example.

In step ST52, the camera control unit 431 acquires the optical conversion information β. The camera control unit 431 acquires the optical conversion information β stored in the adapter information storage unit 331 of the adapter apparatus 33, for example, and proceeds to step ST54. In addition, in a case where the optical conversion information β is not acquired, or a case where the acquired optical conversion information β is changed and newly set, the camera control unit 431 proceeds to step ST53.

In step ST53, the camera control unit 431 sets the optical conversion information β. The camera control unit 431 sets the optical conversion information β based on an instruction from the external device, the user, or the like, for example, and proceeds to step ST54.

In step ST54, the camera control unit 431 acquires the spectroscopic characteristic information $\alpha_i$. The camera control unit 431 acquires the spectroscopic characteristic information $\alpha_i$ stored in the camera information storage unit 404, for example, and proceeds to step ST56. In addition, in a case where it is difficult to acquire the spectroscopic characteristic information $\alpha_i$, or a case where the acquired spectroscopic characteristic information $\alpha_i$ is changed and newly set, the camera control unit 431 proceeds to step ST55.

In step ST55, the camera control unit 431 sets the spectroscopic characteristic information $\alpha_i$. The camera control unit 431 sets the spectroscopic characteristic information $\alpha_i$ based on the instruction from the user, the external device, or the like, for example, and proceeds to step ST56.

In step ST56, the camera control unit 431 acquires the aberration information $k_i$. The camera control unit 431 acquires the aberration information $k_i$ from the imaging lens 21, and proceeds to step ST57.

In step ST57, the camera control unit 431 generates the corrected aberration information $K_i$. The camera control unit 431 performs the correction processing of the aberration information $k_i$ represented in Formula (2) based on the optical conversion information β, and generates the corrected aberration information $J_i$. Furthermore, the camera control unit 431 performs the correction processing of the corrected aberration information $J_i$ represented in Formula (3) based on the optical conversion information $\alpha_i$, generates the corrected aberration information $K_i$, and proceeds to step ST59.

In step ST58, the camera control unit 431 acquires the aberration information $k_i$. The camera control unit 431 acquires the aberration information $k_i$ from the imaging lens 21, and proceeds to step ST59. In addition, the corrected aberration information $K_i$ in which the correction of the aberration information is not performed is the same as the aberration information $k_i$.

In step ST59, the camera control unit 431 calculates the magnification chromatic aberration quantity D. The camera control unit 431 performs the calculation represented in Formula (5) using the corrected aberration information $K_i$, calculates the magnification chromatic aberration quantity D of the image height X, and outputs the calculated magnification chromatic aberration quantity D to the camera signal processing unit 402 which is a correction processing unit that performs the aberration correction. In addition, the calculation of the magnification chromatic aberration quantity D may be performed by the camera signal processing unit 402.

According to such a third embodiment, even if an imaging device with a spectroscopic characteristic different from the spectroscopic characteristic which is assumed by imaging lens is used for the imaging apparatus, the correction of the aberration information in which a difference of the spectroscopic characteristic is considered is performed. Thus, if the aberration correction is performed using the corrected aberration information, it is possible to obtain a good captured image with little aberration, for example. In addition, since the spectroscopic characteristic information can be set or changed, and the optical conversion information can be set or changed, it is possible to control the correction of the aberration information in such a manner that a good captured image with little aberration is obtained.

Furthermore, since the generation of the corrected aberration information $K_i$ is performed in the camera control unit 431, even in a case where an adapter apparatus without the function of correcting the aberration information is used, it is possible to obtain a good captured image with little aberration.

In addition, in the third embodiment, a case where the adapter information storage unit 331 is provided in the adapter apparatus 33 is described. However, if the camera control unit 431 is configured so as to be able to set the optical conversion information with regard to the adapter apparatus 33, it is also possible to use the adapter apparatus without the adapter information storage unit 331.

5. Fourth Embodiment (Case where Adapter Apparatus is not Used)

Next, a configuration of a fourth embodiment will be described. In the fourth embodiment, a case where the adapter apparatus is not used will be described.

5-1. Configuration of Fourth Embodiment

FIG. 10 illustrates a configuration of a fourth embodiment. The imaging system 20 is configured with the imaging lens 21, and the imaging apparatus 44.

The imaging lens 21 includes the optical system block 211, the optical system block drive unit 212, the position detection unit 213, the lens information storage unit 214, and the lens control unit 215.

The optical system block 211 includes a lens group for generating a subject optical image, an aperture adjustment mechanism, or the like. In addition, a shutter mechanism, camera shake correction mechanism, or the like may be provided in the optical system block 211.

The optical system block drive unit 212 drives a lens group based on a control signal from the lens control unit 215, thereby performing a focus operation or a zoom operation. In addition, the optical system block drive unit 212 drives the aperture adjustment mechanism based on a control signal from the lens control unit 215, thereby adjusting the brightness of the subject optical image.

The position detection unit 213 detects a lens position of the lens group in the optical system block 211, or an adjustment position of the aperture adjustment mechanism. The position detection unit 213 outputs a position detection result to the lens control unit 215.

The lens information storage unit 214 stores aberration information for each focus position, lens position or the like. The lens information storage unit 214 stores the coefficient $K_i$ of Formula (1) as the aberration information, for example, the magnification chromatic aberration information with regard to each of the optical image of a blue component and the optical image of a red component for each focus distance, lens position, or the like.

The lens control unit 215 communicates with a camera control unit 441 of the imaging apparatus 44, and generates the control signal using the position detection result or the like and outputs the control signal to the optical system block drive unit 212, in such a manner that the focus operation, the zoom operation, an exposure control, or the like is performed by the imaging lens 21 according to the instruction of the camera control unit 441. In addition, the lens control unit 215 reads the aberration information, for example, the aberration information $k_i$ of a current focus distance or the like from the lens information storage unit 214 according to a request of the adapter apparatus 33, and outputs the aberration information to the requestor.

The imaging apparatus 44 includes the imaging unit 401, the camera signal processing unit 402, the signal output unit 403, the camera information storage unit 404, and the camera control unit 441.

The imaging unit 401 is configured with an imaging device such as a charge coupled device (CCD) sensor or a complementary metal oxide semiconductor (CMOS) sensor. The imaging unit 401 converts a subject optical image formed on the image formation plane of the imaging device into an image signal, and outputs the image signal to the camera signal processing unit 402.

The camera signal processing unit 402 performs various signal processing with respect to the image signal. For example, the camera signal processing unit 402 performs a preceding stage signal processing such as black level correction or gain correction which is performed by using the image signal generated by the imaging unit 401, and performs aberration correction processing which is performed by using the image signal in which the preceding stage signal processing is performed. In addition, the camera signal processing unit 402 performs subsequent stage signal processing such as color conversion or gamma correction which is performed by using the image signal in which the aberration correction processing is performed, and outputs the processing result to the signal output unit 403.

The signal output unit 403 performs signal processing corresponding to display or recording reproduction with regard to the image signal supplied from the camera signal processing unit 402, and outputs the processed signal to an external device or the like as a signal with a predetermined format. For example, the signal output unit 403 performs a size conversion or the like with respect to the image signal so as to be an image size corresponding to a display unit (not illustrated) and outputs the image signal. In addition, the signal output unit 403 performs encoding processing of the image signal, for example, image compression processing performed by an encoding method such as a moving picture experts group (MPEG), H.264/AVC, or H.265/HEVC, and outputs the obtained encoding data or the like to the external device or the like.

The camera information storage unit 404 stores information indicating characteristics of the imaging apparatus 44, various setting states, or the like.

The user interface (I/F) unit 405 is configured with a manipulation switch or the like, generates a manipulation signal according to a user's manipulation, and outputs the manipulation signal to the camera control unit 441.

The camera control unit 441 is configured with a central processing unit (CPU), a read only memory (ROM), a random access memory (RAM), or the like. The camera control unit 441 executes a program which is stored in the ROM or the RAM, and generates the control signal based on the manipulation signal from the user interface unit 405 or the information which is stored in the camera information storage unit 404. The camera control unit 441 supplies the generated control signal to each unit, and thereby each unit is controlled in such a manner that operations according to the user's manipulation are performed in the imaging apparatus 44. In addition, the camera control unit 441 calculates the corrected aberration information $K_i$, based on the aberration information $k_i$ acquired from the imaging lens 21, the optical conversion information β, acquired from the adapter apparatus 33, and the spectroscopic characteristic information $α_i$ stored in the camera information storage unit 404. In addition, the camera control unit 441 calculates an aberration quantity using the corrected aberration information $K_i$, and outputs the calculated aberration quantity to the camera signal processing unit 402. The camera signal processing unit 402 performs the aberration correction processing in such a manner that the calculated aberration quantity is corrected.

A connection of the imaging lens 21 and the imaging apparatus 44 is performed via a mount 51L on a lens side provided in the imaging lens 21 and via a mount 51C on a camera side provided in the imaging apparatus 44.

As described above, in the fourth embodiment, the function of the aberration information acquisition unit, the function of spectroscopic characteristic information acquisition unit, and the function of the aberration information correction unit are provided in the camera control unit 431.

5-2. Operation of Fourth Embodiment

Next, an operation of the fourth embodiment will be described. FIG. 11 is a flow chart illustrating the operation of the fourth embodiment.

In step ST71, the camera control unit 441 determines whether or not the correction of the aberration information is necessary. In a case where the correction according to the spectroscopic characteristic of the imaging device is performed, the camera control unit 441 determines that the correction of the aberration information is necessary, and proceeds to step ST72. In addition, in a case where the correction according to the spectroscopic characteristic of the imaging device is not performed, the camera control unit 441 determines that the correction of the aberration information is not necessary, and proceeds to step ST77. In addition, whether or not the correction according to the spectroscopic characteristic of the imaging device is performed by the imaging apparatus 44, is determined based on the user's instruction with respect to the imaging apparatus 44, a storage state of the spectroscopic characteristic information $α_i$ in the imaging apparatus 44, or the like, for example.

In step ST72, the camera control unit 441 sets the optical conversion information β to a predetermined value. Since the adapter apparatus is not used and the optical conversion is not performed, the camera control unit 441 sets the optical conversion information β as "β=1 (magnification is 1)" and proceeds to step ST73.

In step ST73, the camera control unit 441 acquires the spectroscopic characteristic information $α_i$. The camera control unit 441 acquires the spectroscopic characteristic information $α_i$ stored in the camera information storage unit 404, for example, and proceeds to step ST75. In addition, in a case where it is difficult to acquire the spectroscopic characteristic information $α_i$, or a case where the acquired spectroscopic characteristic information $α_i$ is changed and newly set, the camera control unit 441 proceeds to step ST74.

In step ST74, the camera control unit 441 sets the spectroscopic characteristic information $α_i$ The camera control unit 441 sets the spectroscopic characteristic information $α_i$ based on the instruction from the user, the external device, or the like, for example, and proceeds to step ST75.

In step ST75, the camera control unit 441 acquires the aberration information $k_i$. The camera control unit 441 acquires the aberration information $k_i$ from the imaging lens 21, and proceeds to step ST76.

In step ST76, the camera control unit 441 generates the corrected aberration information $K_i$. The camera control unit 441 performs the correction processing of the aberration information $k_i$ represented in Formula (2) based on the optical conversion information $\beta$, and generates the corrected aberration information $J_i$. Furthermore, the camera control unit 441 performs the correction processing of the corrected aberration information $J_i$ represented in Formula (3) based on the optical conversion information $\alpha_i$, generates the corrected aberration information $K_i$, and proceeds to step ST78.

In step ST77, the camera control unit 441 acquires the aberration information $k_i$. The camera control unit 441 acquires the aberration information $k_i$ from the imaging lens 21, and proceeds to step ST78. In addition, the corrected aberration information $K_i$ in which the correction of the aberration information is not performed is the same as the aberration information $k_i$.

In step ST78, the camera control unit 441 calculates the magnification chromatic aberration quantity D. The camera control unit 441 performs the calculation represented in Formula (5) using the corrected aberration information $K_i$, calculates the magnification chromatic aberration quantity D of the image height X, and outputs the calculated magnification chromatic aberration quantity D to the camera signal processing unit 402 which is a correction processing unit that performs the aberration correction. In addition, the calculation of the magnification chromatic aberration quantity D may be performed by the camera signal processing unit 402.

According to such a fourth embodiment, even if an imaging device with a spectroscopic characteristic different from the spectroscopic characteristic which is assumed by imaging lens is used for the imaging apparatus, the correction of the aberration information in which a difference of the spectroscopic characteristic is considered is performed. Thus, if the aberration correction is performed using the corrected aberration information, it is possible to obtain a good captured image with little aberration, for example. In addition, since the spectroscopic characteristic information can be set or changed, it is possible to control the correction of the aberration information in such a manner that a good captured image with little aberration is obtained.

6. Another Embodiment

However, the embodiment according to the present technology is not limited to the above-described embodiments, and may be configured so as to be automatically switched according to the configuration of the imaging system.

For example, an installation detection mechanism which detects an installation state of the adapter apparatus is provided, and installation detection is performed. Here, in a case where the adapter apparatus is installed in the imaging apparatus, the imaging system performs the operation of one of the first to third embodiments. In addition, in a case where the adapter apparatus is not installed, the imaging system performs the operation of the fourth embodiments. According to this, the imaging system can perform automatically the correction processing of the aberration information according to attachment or detachment of the adapter apparatus.

In addition, the operation may be switched according to the processing of the adapter apparatus. For example, the imaging apparatus communicates with the adapter apparatus, and the operation is switched based on the communication result. In a case where, based on the communication result, it is determined that the adapter apparatus does not have a function of performing the correction processing of the aberration information, the imaging system performs the operation of the third embodiment, and in a case where the adapter apparatus has the function of performing the correction processing of the aberration information, the imaging system performs the operation of the first embodiment or the second embodiment. According to this, even in a case where any one of the adapter apparatus of the related art for which it may not be able to perform the correction processing of the aberration information, and a novel adapter apparatus which can perform the correction processing of the aberration information, is used, it is possible for the imaging system to automatically perform the correction processing of the aberration information.

Furthermore, according to an operation state of the imaging apparatus or the adapter apparatus, the correction of the aberration information may be switched between the two apparatuses. For example, in a case where the load of the camera control unit or the like in the imaging apparatus is increased during the operation of the first embodiment, the imaging system is switched to the operation of the second embodiment, and makes the correction of the aberration information be performed in the adapter apparatus. According to this, it is possible for the imaging system to perform an efficient correction of the aberration information.

In addition, it is possible for a series of processing described in the specification to be performed by hardware, software, or the combined configuration of both. In a case where the processing is performed by the software, a program in which the processing sequence is recorded is installed in a memory in a computer built in dedicated hardware, thereby being executed. Alternatively, it is possible to install in order to execute the program in a general computer which can perform various processing.

For example, it is possible for the program to be stored in advance in a recording medium, such as a hard disk, a solid state drive (SSD), or a read only memory (ROM). Alternatively, it is possible for the program to be stored (recorded) temporarily or permanently in a removable recording medium such as a flexible disk, a compact disc read only memory (CD-ROM), a magneto optical (MO) disk, a digital versatile disc (DVD), a blu-ray disc (BD) (registered trademark), a magnetic disk, or a semiconductor memory card. It is possible for such a removable recording medium to be provided as so-called packaged software.

In addition, in addition to the installation of the program in the computer from the removable recording medium, the program may be transferred by wire or wirelessly to the computer from a download site via a network such as a local area network (LAN) or the internet. The computer receives the programs transferred in such a manner, and can install the program in an embedded recording medium such as a hard disk.

In addition, the present technology is not construed so as to be limited to the embodiment of the above-described technology. The embodiments of such a technology discloses the present technology in the form of examples, and it is apparent that those skilled in the art can modify or substitute the embodiments in a range without departing from the gist of the present technology. That is, in order to determine the gist of the present technology, the scope of claims may be referred to.

In addition, the aberration correction apparatus of the present technology can also employ the following configurations.

(1) An aberration correction apparatus including: an aberration information acquisition unit which acquires aberration information from an imaging lens; a spectroscopic characteristic information acquisition unit which acquires spectroscopic characteristic information of an imaging device which performs a photoelectric conversion of an optical image that is formed in the imaging lens; and an aberration information correction unit which performs a correction according to the spectroscopic characteristic information with respect to the acquired aberration information.

(2) The aberration correction apparatus described in (1), in which the spectroscopic characteristic information is information which is set based on a reference spectroscopic characteristic when the aberration information acquired from the imaging lens is generated, and based on a spectroscopic characteristic of the imaging device.

(3) The aberration correction apparatus described in (2), in which the spectroscopic characteristic information is information which is generated for each color component different from one color component which is used as a reference, among three primary color components.

(4) The aberration correction apparatus described in any one of (1) to (3), in which the spectroscopic characteristic information acquisition unit accepts setting of the spectroscopic characteristic information or modification of the acquired spectroscopic characteristic information in a case where it is difficult to acquire the spectroscopic characteristic information.

(5) The aberration correction apparatus described in any one of (1) to (4), further including: an optical conversion information acquisition unit which acquires optical conversion information on an optical conversion which is performed with respect to the optical image, in which the aberration information correction unit performs correction according to the spectroscopic characteristic information and the optical conversion information with respect to the acquired aberration information.

(6) The aberration correction apparatus described in (5), in which the optical conversion information acquisition unit accepts setting of the optical conversion information or modification of the acquired optical conversion information in a case where it is difficult to acquire the optical conversion information.

(7) The aberration correction apparatus described in (5) or (6), in which the optical conversion information is information which represents an expansion magnification or a contraction magnification of the optical image.

(8) The aberration correction apparatus described in (7), in which the expansion magnification or the contraction magnification is set by using an imaging plane size of an imaging device which is defined in aberration information acquired from the imaging lens, and by using an imaging plane size of an imaging device which performs a photoelectric conversion of an optical image which is formed in the imaging lens, as a reference.

(9) The aberration correction apparatus described in any one of (1) to (8), further including: a first mount unit for connecting the imaging lens; and a second mount unit for connecting an imaging apparatus which uses the imaging device.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus comprising:
   an imager configured to output an image signal; and
   circuitry configured to correct aberration information according to spectroscopic characteristic information of the imager, the aberration information being received from an imaging lens or an adapter apparatus.

2. The imaging apparatus according to claim 1, wherein the circuitry is configured to correct the image signal based on the corrected aberration information.

3. The imaging apparatus according to claim 2, wherein the circuitry is configured to correct the aberration information based on optical conversion information regarding optical conversion with respect to an image represented by the image signal.

4. The imaging apparatus according to claim 3, wherein the circuitry is configured to receive the optical conversion information from the adapter apparatus.

5. The imaging apparatus according to claim 1, further comprising:
   a mount that couples the imaging lens or the adapter apparatus to the imaging apparatus.

6. The imaging apparatus according to claim 1, wherein the circuitry is configured to correct the aberration information based on a reference spectroscopic characteristic when the aberration information is generated and the spectroscopic characteristic information of the imager.

7. The imaging apparatus according to claim 1, wherein the spectroscopic characteristic information is generated for each color component different from one color component which is used as a reference, among three primary color components.

8. The imaging apparatus according to claim 1, wherein the circuitry is configured to accept setting of the spectroscopic characteristic information or modification of the received spectroscopic characteristic information.

9. The imaging apparatus according to claim 1, wherein the circuitry is configured to switch a correction operation of the aberration information according to processing of the adapter apparatus.

10. The imaging apparatus according to claim 1, wherein a format of the imager is super 35 mm.

11. The imaging apparatus according to claim 1, wherein the imaging lens is used for a ⅔ inch type imager.

12. An information processing method comprising:
    receiving, from an imaging apparatus, spectroscopic characteristic information of an imager of the imaging apparatus; and
    correcting aberration information according to the spectroscopic characteristic information.

13. An information processing apparatus comprising:
    circuitry configured to
    receive, from an imaging apparatus, spectroscopic characteristic information of an imager of the imaging apparatus; and
    correct aberration information according to the spectroscopic characteristic information.

14. The information apparatus according to claim 13, wherein the circuitry is configured to correct the aberration information based on a reference spectroscopic characteristic when the aberration information is generated and the spectroscopic characteristic information of the imager of the imaging apparatus.

15. The information apparatus according to claim 13, wherein the spectroscopic characteristic information is generated for each color component different from one color component which is used as a reference, among three primary color components.

16. The information apparatus according to claim 13, wherein the circuitry is configured to accept setting of the spectroscopic characteristic information or modification of the received spectroscopic characteristic information.

17. The information apparatus according to claim 13, wherein the circuitry is configured to correct the aberration information based on optical conversion information regarding optical conversion with respect to an image through an imaging lens.

18. The information apparatus according to claim 17, wherein the circuitry is configured to accept setting of the optical conversion information, or modification of the optical conversion information.

19. The information apparatus according to claim 17, wherein the optical conversion information represents an expansion magnification or a contraction magnification of the image.

20. The information apparatus according to claim 19, wherein the expansion magnification or the contraction magnification is set based on an imaging plane size which is defined in the aberration information and an imaging plane size of the imager of the imaging device.

21. The information apparatus according to claim 13, further comprising:
    a first mount that couples an imaging lens to the information apparatus; and
    a second mount that couples the imaging apparatus to the information apparatus.

22. The information apparatus according to claim 13, wherein the circuitry is configured to acquire the aberration information from an imaging lens.

23. The information apparatus according to claim 13, further comprising: a memory configured to store the aberration information.

24. The information apparatus according to claim 13, wherein a format of the imager is super 35 mm.

* * * * *